United States Patent
Tamir et al.

(10) Patent No.: US 10,552,207 B2
(45) Date of Patent: Feb. 4, 2020

(54) SYSTEMS AND METHODS FOR MULTI-ARCHITECTURE COMPUTING INCLUDING PROGRAM STACK TRANSLATION

(71) Applicant: Intel Corporation, Santa Clara, CA (US)

(72) Inventors: Eliezer Tamir, Bait Shemesh (IL); Ben-Zion Friedman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/386,990

(22) Filed: Dec. 21, 2016

(65) Prior Publication Data

US 2018/0173529 A1 Jun. 21, 2018

(51) Int. Cl.
G06F 9/30 (2018.01)
G06F 9/48 (2006.01)
G06F 8/41 (2018.01)
G06F 9/50 (2006.01)

(52) U.S. Cl.
CPC ............... *G06F 9/485* (2013.01); *G06F 8/41* (2013.01); *G06F 9/3009* (2013.01); *G06F 9/4856* (2013.01); *G06F 9/5088* (2013.01); *Y02D 10/24* (2018.01); *Y02D 10/32* (2018.01)

(58) Field of Classification Search
CPC .................................................... G06F 9/485
See application file for complete search history.

(56) References Cited

U.S. PATENT DOCUMENTS

| | | | |
|---|---|---|---|
| 5,598,546 A | 1/1997 | Blomgren | |
| 7,047,394 B1 | 5/2006 | Dyke et al. | |
| 7,480,901 B2 | 1/2009 | Arenburg et al. | |
| 7,634,768 B2 * | 12/2009 | Chen | G06F 9/45516 717/162 |
| 7,707,389 B2 | 4/2010 | Banerjee et al. | |
| 2003/0123587 A1 | 7/2003 | Blaum et al. | |
| 2003/0182655 A1 * | 9/2003 | Hundt | G06F 9/4486 717/158 |

(Continued)

OTHER PUBLICATIONS

Ezzeddine, Mazen, et al., "Ubiquitous Computing Platform via Hardware Assisted ISA Virtualization," 2013 9th International Conference on Innovations in Information Technology (IIT), Mar. 17, 2013, pp. 1-6. https://ieeexplore.ieee.org/stamp/stamp.jsp?tp=&arnumber=6544401.

(Continued)

*Primary Examiner* — Michael J Metzger
(74) *Attorney, Agent, or Firm* — Patent Capital Group

(57) ABSTRACT

Disclosed herein are systems and methods for multi-architecture computing. For example, in some embodiments, a computing device may include: a processor system including at least one first processing core having a first instruction set architecture (ISA), and at least one second processing core having a second ISA different from the first ISA; and a memory device coupled to the processor system, wherein the memory device has stored thereon a first binary representation of a program for the first ISA and a second binary representation of the program for the second ISA, and the memory device has stored thereon data for the program having an in-memory representation compatible with both the first ISA and the second ISA.

21 Claims, 11 Drawing Sheets

(56) References Cited

U.S. PATENT DOCUMENTS

| | | | |
|---|---|---|---|
| 2004/0268107 A1 | 12/2004 | Zimmer et al. | |
| 2005/0172105 A1 | 8/2005 | Doering et al. | |
| 2005/0216627 A1 | 9/2005 | Goud et al. | |
| 2006/0080682 A1 | 4/2006 | Anwar et al. | |
| 2008/0022278 A1 | 1/2008 | Gschwind et al. | |
| 2008/0059769 A1 | 3/2008 | Rymarczyk et al. | |
| 2008/0172657 A1 | 7/2008 | Bensal et al. | |
| 2009/0037911 A1 | 2/2009 | Ahuja et al. | |
| 2009/0144528 A1* | 6/2009 | Asai | G06F 9/4484 712/229 |
| 2010/0083223 A1 | 4/2010 | Chouinard et al. | |
| 2010/0125837 A1* | 5/2010 | Lobo | G06F 8/443 717/157 |
| 2010/0153921 A1* | 6/2010 | Klein | G06F 11/3636 717/124 |
| 2012/0324465 A1* | 12/2012 | Miskelly | G06F 9/5038 718/104 |
| 2013/0290645 A1 | 10/2013 | Ven | |
| 2013/0338993 A1 | 12/2013 | Zhong et al. | |
| 2014/0189679 A1 | 7/2014 | Adams et al. | |
| 2014/0196019 A1 | 7/2014 | Chen | |
| 2014/0208043 A1 | 7/2014 | Goddard | |
| 2014/0244983 A1 | 8/2014 | McDonald et al. | |
| 2015/0026432 A1 | 1/2015 | Borkenhagen et al. | |
| 2015/0269004 A1 | 9/2015 | Gainey et al. | |
| 2016/0202980 A1 | 7/2016 | Henry et al. | |
| 2016/0216951 A1 | 7/2016 | Kruglick et al. | |
| 2016/0283211 A1 | 9/2016 | Bertolli et al. | |
| 2016/0283438 A1* | 9/2016 | Chen | G06F 13/4027 |
| 2016/0321089 A1 | 11/2016 | Sandlin et al. | |
| 2016/0364276 A1 | 12/2016 | Wu et al. | |
| 2017/0116029 A1 | 4/2017 | Azam et al. | |
| 2018/0173530 A1 | 6/2018 | Tamir et al. | |
| 2018/0173674 A1 | 6/2018 | Tamir et al. | |
| 2018/0173675 A1 | 6/2018 | Tamir et al. | |

OTHER PUBLICATIONS

Hu, Yikun, et al., "Cross-Architecture Binary Semantics Understanding via Similar Code Comparison," 2016 IEEE 23rd International Conference on Software Analysis, Evolution, and Reengineering, Mar. 10, 2016, pp. 57-66. https://ieeexplore.ieee.org/stamp/stamp.jsp?tp=&arnumber=7476630.

USPTO Non-Final Office Action issued in U.S. Appl. No. 15/386,919, dated Apr. 20, 2018, 45 pages.

Cunningham, "'Samsung Dex' is a $150 Galaxy S8 dock that makes your phone into a desktop", Gear Gadgets, Mar. 30, 2017, 3 pages.

Gite, "Linux Hotplug a CPU and Disable CPU Cores at Run Time", nixCraft, Apr. 2, 2009, 10 pages.

Tamir et al., "Systems and Methods for Multi-Architecture Computing", U.S. Appl. No. 15/386,833, filed Dec. 21, 2016.

Tamir et al., "Systems and Methods for Multi-Architecture Computing", U.S. Appl. No. 15/386,919, filed Dec. 21, 2016.

Tamir et al., "Systems and Methods for Multi-Architecture Computing", U.S. Appl. No. 15/387,106, filed Dec. 21, 2016.

VMware, "Citrix to have a crack at desktops on docked smartphones", Mar. 29, 2017; 2 pages.

USPTO Jul. 25, 2018 Non-Final Office Action issued in U.S. Appl. No. 15/386,833, 14 pages.

USPTO Jul. 25, 2018 Non-Final Office Action issued in U.S. Appl. No. 15/387,106, 13 pages.

Di Federico, Allessandro, "A Jump-Target Identification Method for Multi-Architecture Static Binary Translation," Cases '16—Proceedings of the International Conference on Compilers, Architectures and Synthesis for Embedded Systems 2016, Oct. 1-7, 2016, Pittsburgh, PA; 10 pages.

Karaki, Hussein, et al., "Multiple Instruction Sets Architecture (MISA)," 2011 International Conference on Energy Aware Computing, Nov. 30-Dec. 2, 2011, Instanbul, Turkey; 6 pages.

USPTO Nov. 16, 2018 Final Office Action from U.S. Appl. No. 15/386,919; 50 pages.

USPTO Dec. 19, 2018 Nonfinal Office Action from U.S. Appl. No. 15/387,106; 12 pages.

USPTO Dec. 20, 2018 Final Office Action from U.S. Appl. No. 15/386,833; 11 pages.

USPTO Mar. 21, 2019 Non-Final Office Action issued in U.S. Appl. No. 15/386,833.

USPTO Mar. 5, 2019 Nonfinal Office Action from U.S. Appl. No. 15/386,919.

Venkat, Ashish, "Harnessing ISA Diversity: Design of a Heterogeneous-ISA Chip Multiprocessor," ISCA '14—Proceeding of the 41st Annual International Symposium on Computer Architecuture, Minneapolis, Minnesota, USA—Jun. 14-18, 2014; 12 pages.

USPTO Jun. 4, 2019 Final Office Action from U.S. Appl. No. 15/387,106; 22 pages.

USPTO Aug. 15, 2019 Non-Final Office Action issued in U.S. Appl. No. 15/386,833, 10 pages.

* cited by examiner

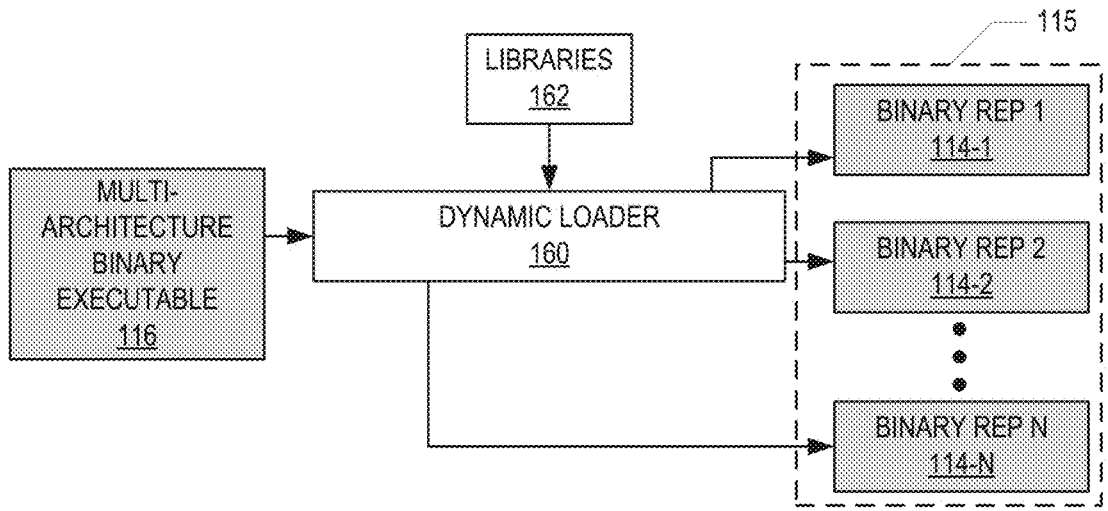
FIG. 5
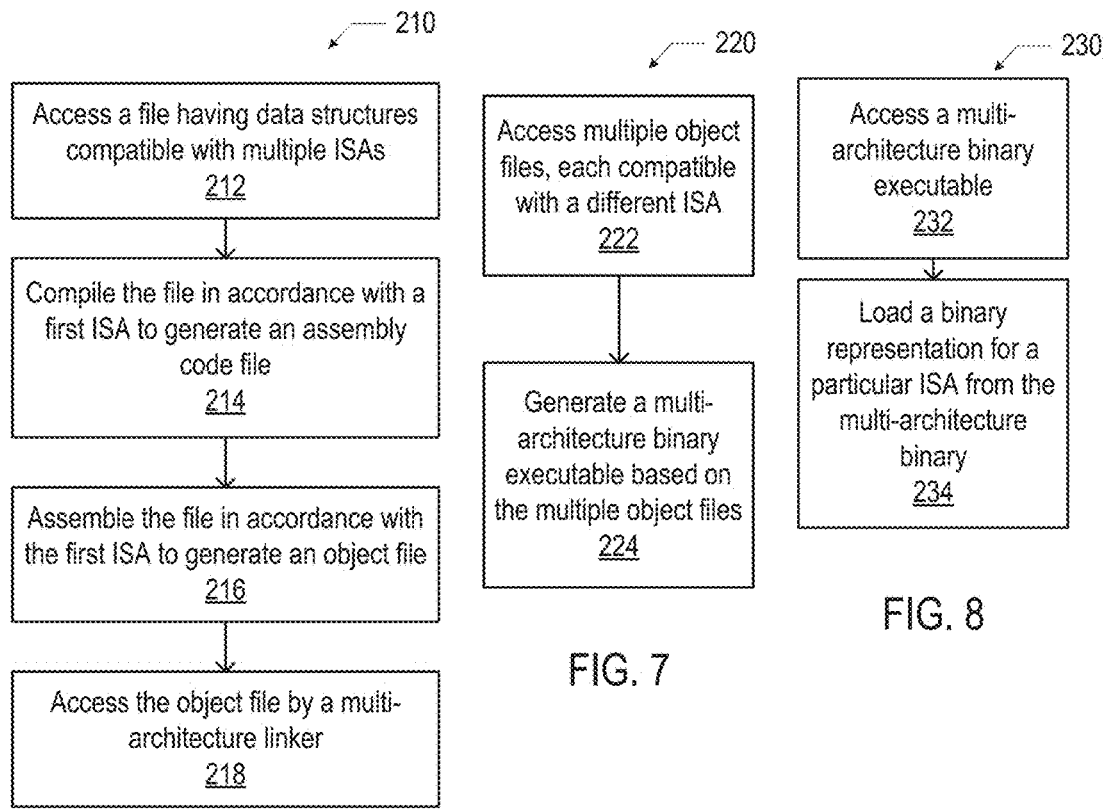
FIG. 6
FIG. 7
FIG. 8

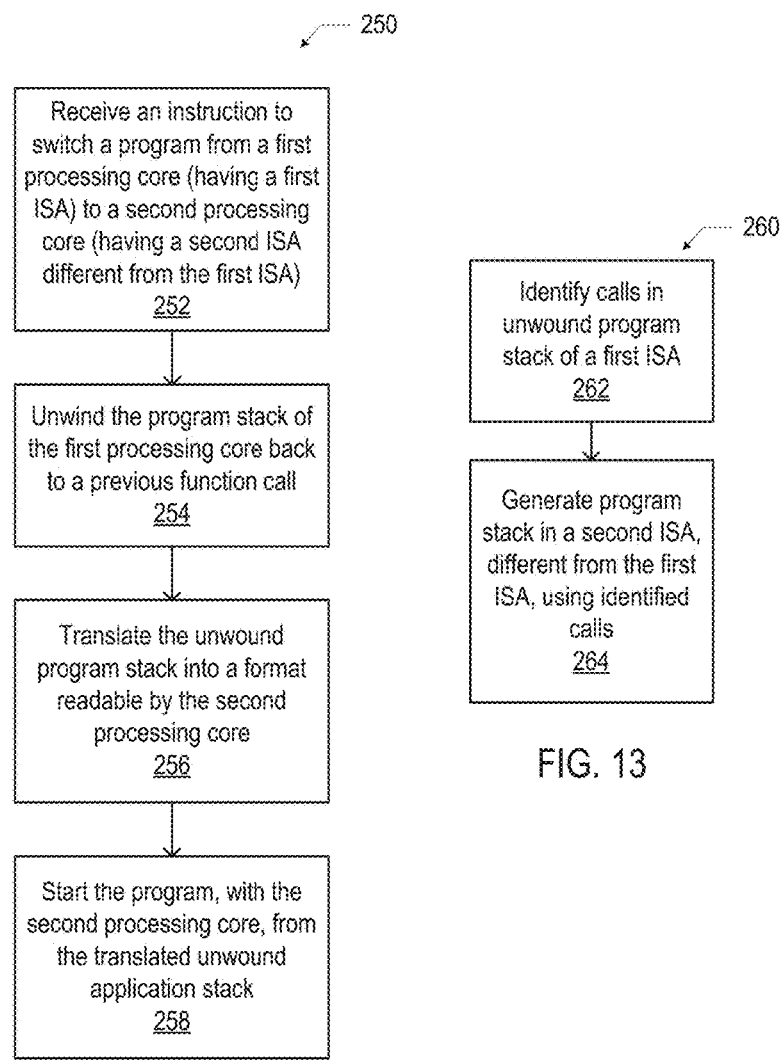

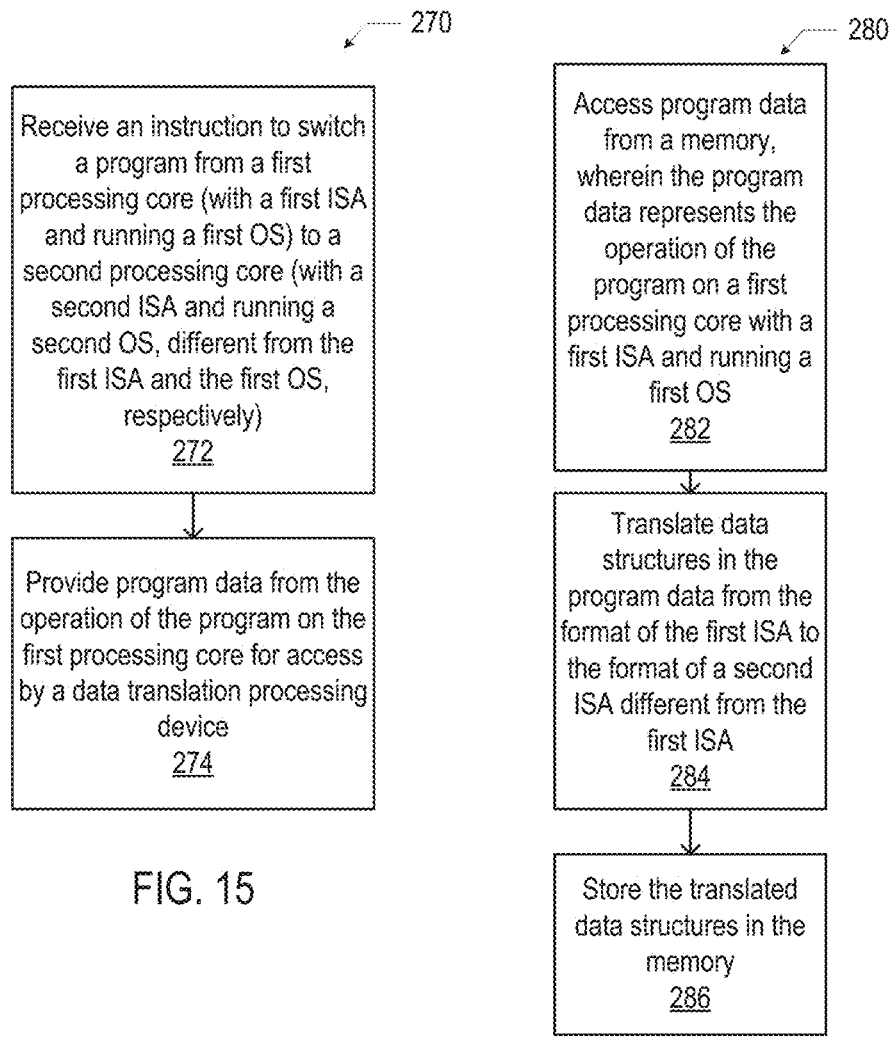
FIG. 15
FIG. 16
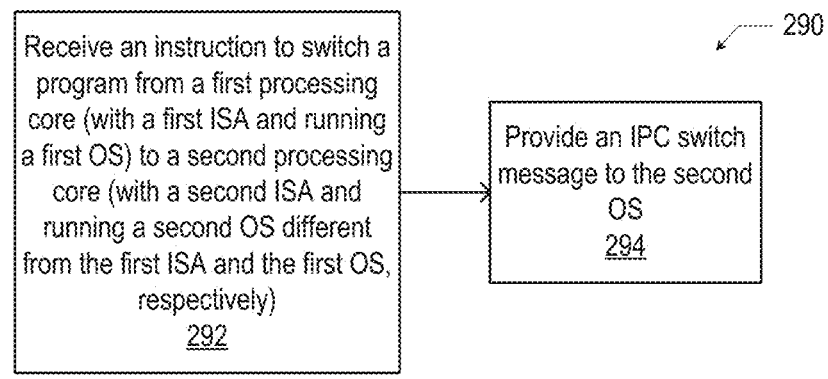
FIG. 17

SYSTEMS AND METHODS FOR MULTI-ARCHITECTURE COMPUTING INCLUDING PROGRAM STACK TRANSLATION

BACKGROUND

Data centers include collections of computing resources that service the requests of client devices. These client devices are often remote, communicating their requests over an intervening communications network.

BRIEF SUMMARY OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 illustrates the generation of a binary executable from a multi-architecture binary executable, in accordance with various embodiments.

FIG. 6 is a flow diagram of an illustrative method of compiling and assembling a file in a multi-architecture computing device, in accordance with various embodiments.

FIG. 7 is a flow diagram of an illustrative method of generating a multi-architecture binary executable, in accordance with various embodiments.

FIG. 8 is a flow diagram of an illustrative method of loading a binary executable from a multi-architecture binary executable, in accordance with various embodiments.

FIG. 12 is a flow diagram of an illustrative method of transferring execution of a program across processing cores having different ISAs using stack unwinding, in accordance with various embodiments.

FIG. 13 is a flow diagram of an illustrative method of translating a program stack from one ISA to another ISA, in accordance with various embodiments.

FIG. 15 is a flow diagram of an illustrative method of switching operation of a program from a processing core with one ISA to a processing core with a different ISA, in accordance with various embodiments.

FIG. 16 is a flow diagram of an illustrative method of translating data structures compatible with one ISA to data structures compatible with another ISA in a multi-architecture computing device, in accordance with various embodiments.

FIG. 17 is a flow diagram of an illustrative method of signaling a switch in the execution of a program from one processing core to another processing core using a different operating system, in accordance with various embodiments.

DETAILED DESCRIPTION

Disclosed herein are systems and techniques for enabling collaboration between processing devices (e.g., processing cores) having different instruction set architectures (ISAs) into a single computing device. Some of the embodiments disclosed herein may use data representations (e.g., in-memory binary formats, in-memory data structures, register content, and on-stack data) that are portable and/or translatable between different ISAs. Various embodiments disclosed herein may provide data center owners with flexibility in job scheduling, power efficiency, and cost savings that could not be previously achieved.

In the following detailed description, reference is made to the accompanying drawings that form a part hereof wherein like numerals designate like parts throughout, and in which is shown, by way of illustration, embodiments that may be practiced. Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide/s the described functionality. The accompanying drawings are not necessarily drawn to scale.

Figure 1:
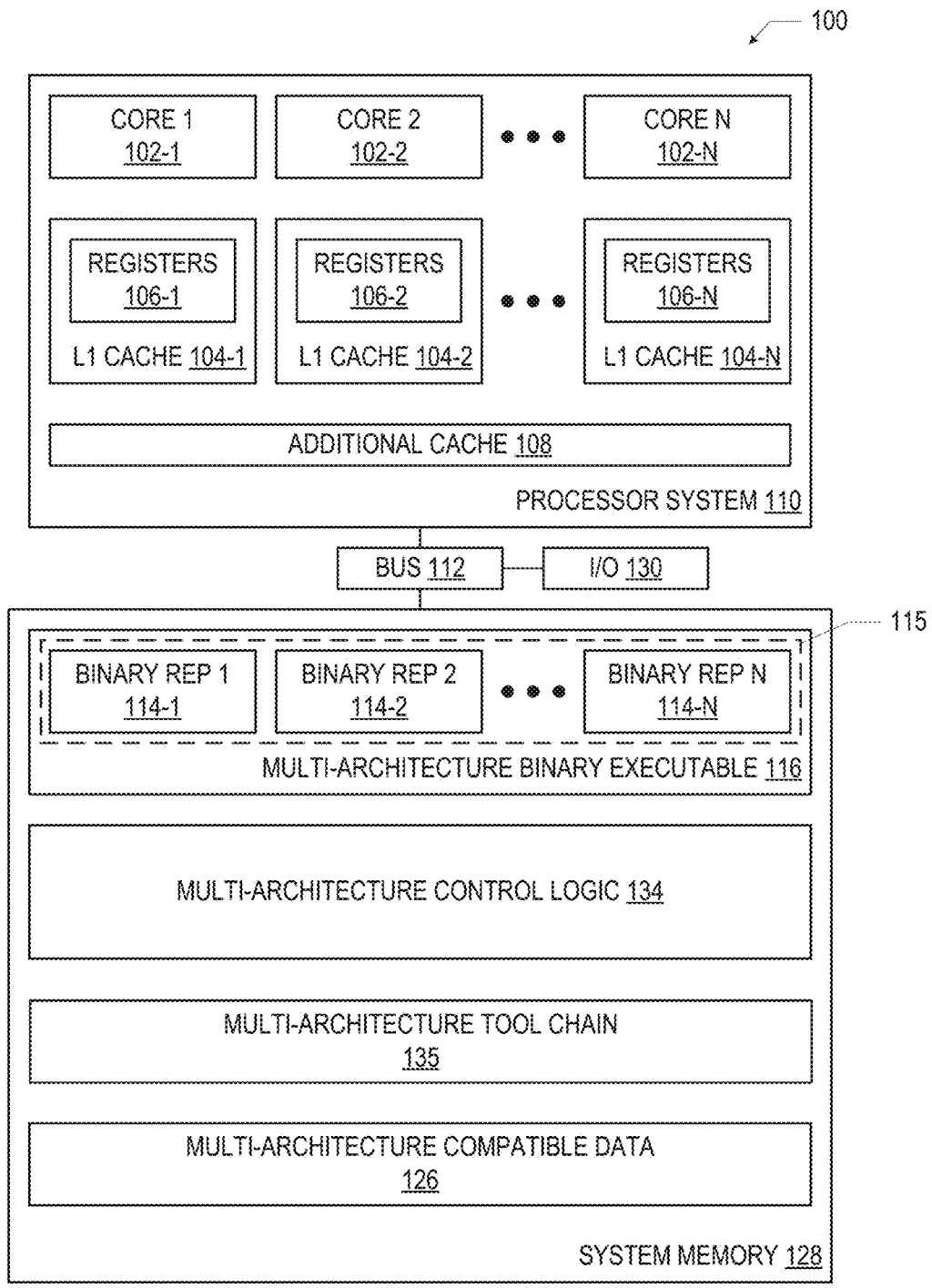
FIG. 1 is a block diagram of a multi-architecture computing device, in accordance with various embodiments.

FIG. 1 is a block diagram of a multi-architecture computing device 100, in accordance with various embodiments.

The computing device 100 may include a processor system 110, a system memory 128, and a bus 112 through which the processor system 110 in the system memory 128 may communicate. The computing device 100 may also include input/output (I/O) interfaces and/or devices 130. The I/O interfaces and/or devices 130 may include any suitable I/O devices and/or interfaces, such as any of the I/O devices and/or interfaces discussed below with reference to FIG. 20. In some embodiments, the computing device 100 may be a server (e.g., a monolithic or disaggregated server). For example, the computing device 100 may be a server in a data center, and may be one of many multi-architecture computing devices 100 acting as servers in the data center, as discussed below with reference to FIG. 19.

The processor system 110 may include multiple processing cores 102. At least two of the processing cores 102 included in the processor system 110 may have different ISAs. In the example computing device 100 illustrated in FIG. 1, N different processing cores 102 are illustrated (identified as processing cores 102-1, 102-2, . . . , 102-N), and each of these processing cores 102 may have a different ISA. Note that, although only a single processing core 102-1 is illustrated, multiple processing cores having the same ISA as the processing core 102-1 may be included in the processor system 110; similarly, multiple processing cores having the same ISA for any particular ISA may be included in the processor system 110. For example, two processing cores 102 having the same ISA as the processing core 102-1 may be included in the processor system 110, four processing cores having the same ISA as the processing core 102-2 may be included in the processor system 110, etc. As used herein, the notation "processing core 102-K" may be used to refer to a processing core having an ISA "K" (which may be, for example, any ISA). As used herein, the notation "processing core 102-K" and "processing core 102-J" may be used to refer to processing cores having two different ISAs ("K" and "J," respectively). In some embodiments, the processor system 110 may be a central processing unit (CPU) having multiple cores 102, or different combinations of the cores 102 may provide different CPUs.

The ISAs associated with different processing cores 102 may include any suitable ISA, and the processor system 110 may represent any desired combination of ISAs. Two different ISAs may have sets of operation codes (opcodes) that are not the same, nor is the set of opcodes for one of the ISAs a subset of the set of opcodes for the other ISA. An ISA may specify how and where operands are stored, how many operands are named in an instruction, what operations are available, and/or the type and size of operands.

In some embodiments, one or more of the processing cores 102 may have a complex instruction set computing (CISC) ISA. In some embodiments, one or more of the processing cores 102 may have a reduced instruction set computing (RISC) ISA. A processing core 102 with a CISC ISA may be a higher performance core, and a processing core 102 with a RISC ISA may be a lower performance core; thus, shifting data processing tasks between them may enable the multi-architecture computing device 100 to flexibly respond to demand and improve power consumption. In some embodiments, one or more of the processing cores 102 may have an ISA with an endianness (the order of bits of a digital value in memory) that is different from an endianness of an ISA of one or more of the other processing cores 102. In some embodiments, one or more of the processing cores 102 may have an ISA with a word size that is different from a word size of an ISA of one or more of the other processing cores 102. In some embodiments, one or more of the processing cores 102 may have an ISA whose address space differs from an address space of an ISA of one or more of the other processing cores 102 (e.g., by having different numbers of bits in an address and/or by having different data storage layouts for a same operating system). In some embodiments, one or more of the processing cores 102 may have an ISA that can process a first number of operands in a single instruction, and one or more of the other processing cores 102 may have an ISA that can process a second, different number of operands in a single instruction (e.g., 3 versus 2). Examples of ISAs include Alpha, Blackfin, SPARC, x86, x86-64, AVR32, AArch64, 68k, FR-V, Hexagon, PA-RISC, H8, IBM, M32R, Microblaze, MN103, OpenRISC, Power, ARC, PowerPC, SuperH, ARM (32- and 64-bit), MIPS, and Intel architectures (e.g., IA-32, IA-64, and Intel 64); any of these ISAs may be associated with different processing cores 102 in the multi-architecture computing device 100.

Each of the processing cores 102 may have an associated level 1 (L1) cache 104. Registers 106 associated with a particular processing core 102 may be included in the L1 cache 104 associated with that processing core 102, as illustrated in FIG. 1. The processor system 110 may include additional cache 108, which may include additional cache storage assigned to different processing cores 102, additional cache storage shared by different processing cores 102, or both.

In some embodiments, the system memory 128 may provide a coherent memory space for the different processing cores 102 in the processor system 110. All of the processing cores 102 may be able to access the system memory 128 (e.g., via the bus 112), and any suitable coherency protocol may be employed to notifying all of the processing cores 102 of changes to shared values.

In some embodiments, the system memory 128 may include a multi-architecture binary executable 116. The multi-architecture binary executable 116 may include data for multiple binary representations 114. Different binary representations 114 included in the multi-architecture binary executable 116 may correspond to different ISAs (and therefore different processing cores 102). FIG. 1, for example, illustrates binary representations 114-1, 114-2, . . . , 114-N. The different binary representations 114 may all represent a common program 115 (abstractly indicated by the dashed line in FIG. 1) such that execution of the binary representation 114-J by the processing core 102-J may result in the performance of the same set of tasks as execution of the binary representation 114-K by the processing core 102-K.

As used herein, a "program" may refer to any suitable set of operations, and may include an application (e.g., the applications 136 discussed below with reference to FIG. 2), a virtual machine (e.g., the virtual machines 133 discussed below with reference to FIG. 2), or a container (e.g., as the containers 141 discussed below with reference to FIG. 2). In some embodiments, a program may be associated with a particular set of source code. For ease of discussion, all of the binary representations 114 discussed herein are assumed to correspond to a same single program 115, but any of the multi-architecture computing devices 100 disclosed herein may include multiple such sets of binary representations 114, representing multiple different programs 115, each of which may be executed by multiple processing cores 102. Thus, any of the multi-architecture computing devices 100 disclosed herein may hand off operation of multiple programs 115 between different combinations of processing cores 102 having different ISAs.

In some embodiments, the different binary representations 114 may be included in the multi-architecture binary executable 116 as different executable and linkable format (ELF) sections. Each of the ELF sections may have a different name (included in the section header) identifying the ISA corresponding to the binary representation 114 in that section. When the multi-architecture binary executable 116 is loaded (e.g., by a dynamic loader, as discussed below with reference to FIG. 5), the ISA of the processing core 102 on which the program 115 is to be run may be identified, and the binary representation 114 included in the ELF section corresponding to that ISA may be selectively loaded and executed (without executing the binary representations 114 in the ELF sections corresponding to other ISAs). In this manner, the multi-architecture binary executable 116 may be selectively loaded to execute on multiple different ISAs.

In some embodiments, the different binary representations 114 may be included in the multi-architecture binary executable 116 as differently named functions for each ISA. For example, the multi-architecture binary executable 116 may include multiple different "main" functions for each of the different ISAs (e.g., one "main" function titled "ISA1_main," another titled "ISA2_main," etc.). At load time, the dynamic loader 160 may use only the functions whose names correspond to the target ISA. This approach may be used alternatively to, or in conjunction with, different ELF sections for different ISAs.

In some embodiments, different binary representations 114 representing the same program 115 may not be included in a single multi-architecture binary executable 116, but may instead exist as separate, fully working binary executables. In such embodiments, the binary representation 114-1 is a binary executable that is compatible with the ISA of the processing core 102-1 and representative of the program 115, the binary representation 114-2 is a binary executable that is compatible with the ISA of the processing core 102-2 and representative of the program 115, etc. Using separate, fully working binary executables for the different binary representations 114, instead of using a multi-architecture binary executable 116, may put less of the processing workload on the multi-architecture linker 154 (an "offline" component, discussed below) and more on the dynamic loader 160 (an "online" component, discussed below), and may be particularly appropriate when the computing device 100 supports a large number of ISAs but only a small subset is expected to run a particular program 115.

In some embodiments, the system memory 128 may store multi-architecture compatible data 126. The multi-architecture compatible data 126 may be data generated and/or used by the execution of a program 115 on a processing core 102-K that is compatible with (e.g., may be read by) the same program 115 executing on a processing core 102-J. For example, the multi-architecture compatible data 126 may have an endianness and word size that allows it to be correctly interpreted by processing cores 102 having different ISAs. For example, compatibility between 32- and 64-bit ISAs may be achieved by padding or splitting 64-bit variables into two 32-bit ones. Endianness may be addressed by demarcating compatible structure boundaries and performing appropriate conversion operations on access. In some embodiments, the multi-architecture compatible data 126 may be addressed so that the data may be correctly interpreted by processing cores 102 having different ISAs. For example, when different ISAs have address space differences, offset calculations and layout translations may be used to generate a multi-architecture compatible address space representation. The in-memory representation of the multi-architecture compatible data 126 may thus be compatible with multiple ISAs.

In some embodiments, some of the multi-architecture compatible data 126 may only be compatible with a subset of the ISAs represented in the processor system 110. For example, if the processor system 110 includes processing cores 102 that, among them, represent ISAs A, B, and C, some of the multi-architecture compatible data 126 may be compatible with the ISAs A and B but not C, some of the multi-architecture compatible data 126 may be compatible with the ISAs B and C but not A, some of the multi-architecture compatible data 126 may be compatible with the ISAs A and C but not B, and some of the multi-architecture compatible data 126 may be compatible with the ISAs A, B, and C. Which multi-architecture compatible data 126 is compatible with which ISAs may depend on which processing cores 102 will be transferring handling of the program 115 between them. For example, if a particular program 115 will be handled only by the processing cores 102-J and 102-K, the multi-architecture compatible data 126 associated with the operation of the program 115 may be compatible with at least the ISAs J and K (and perhaps not other ISAs). Thus, the ISA compatibility of data associated with a program 115 may be different for different programs 115.

The different binary representations 114 (e.g., included or not included in the multi-architecture binary executable 116) may utilize the multi-architecture compatible data 126 so that execution of the program 115 may be handed off between any of the processing cores 102 (each executing their associated binary representation 114). Handing off execution of a program between different processing cores has traditionally been limited to processing cores having the same ISA (and, therefore, the same data structure requirements, address space arrangements, etc.). The systems and techniques disclosed herein may enable entirely new ways of using processing cores (e.g., in a data center environment) to achieve greater flexibility, increased computational efficiency, reduced power consumption, and/or other benefits not achievable with traditional approaches.

In some embodiments, the system memory 128 may include multi-architecture control logic 134. The multi-architecture control logic 134 may be responsible for scheduling transfer of execution of the program 115 from one processing core 102 to another processing core 102 and supporting the transfer of execution of the program 115 by, for example, generating data about the state of the program 115 as it halts on one processing core 102 before it is resumed by another processing core 102. The multi-architecture control logic 134 may also control the loading of the binary representations 114 (e.g., in the form of a multi-architecture binary executable 116). Examples of multi-architecture control logic 134 are discussed in detail below (e.g., with reference to FIGS. 3, 5 and 8-13). In some embodiments, the multi-architecture control logic 134 may cause the execution of the binary representation 114-J on the associated processing core 102-J to halt and may cause the execution of the binary representation 114-K on the associated processing core 102-K to begin; the execution of the binary representation 114-J may use and/or generate some of the multi-architecture compatible data 126, and the execution of the binary representation 114-K may use and/or generate some of the multi-architecture compatible data 126. For example, multi-architecture compatible data 126 used or generated by the binary representation 114-J may be used by the binary representation 114-K during execution.

In some embodiments, the multi-architecture control logic 134 may transfer control of a program 115 between a processing core 102-J and a processing core 102-K, wherein the processing core 102-J and the processing core 102-K have different baseline power consumption (e.g., the processing core 102-J is a higher-performance processing core, and therefore consumes more power than the processing core 102-K). Handing off tasks between such processing cores 102-J and 102-K may enable the multi-architecture computing device 100 to respond to changes in demand on the multi-architecture computing device 100 (e.g., from client devices 186, as discussed below with reference to FIG. 19). For example, in some embodiments, the multi-architecture computing device 100 may provide, among other things, a customer-facing program 115 (e.g., serving a webpage, providing a network service, etc.). When demand for the program 115 is low (e.g., below a designated threshold), the multi-architecture control logic 134 may assign execution of the program 115 to the lower power (and thus lower performance) processing core 102-K. If demand for the program 115 becomes high (e.g., above a designated threshold), the multi-architecture control logic 134 may hand off execution of the program 115 to the higher-power (and thus higher-performance) processing core 102-J; the multi-architecture control logic 134 may hand the program 115 back to the processing core 102-K if the demand for the program 115 becomes low again.

In some embodiments, the system memory 128 may include multi-architecture toolchain 135. The multi-architecture toolchain 135 may control the generation of the binary representations 114 (e.g., in the form of a multi-architecture binary executable 116), and may include a pre-processor, compiler, assembler, and linker (e.g., as discussed below). The multi-architecture toolchain 135 may include a set of programming tools that may be used (e.g., in sequence or in another relative arrangement) to generate different binary representations 114 of the program 115. Although FIG. 1 illustrates the multi-architecture toolchain 135 as part of the system memory 128 of the multi-architecture computing device 100, the multi-architecture toolchain 135 may not be part of the multi-architecture computing device 100, but may instead be used on a separate computing device, such as the development computing device 137 discussed below with reference to FIG. 19. In such embodiments, the multi-architecture toolchain 135 may operate on this separate computing device to generate the binary representations 114, and then these binary representations 114 may be installed in the system memory 128 of the multi-architecture computing device 100 (e.g., by using a transportable computer readable media having the binary representations 114 thereon to bring the binary representations from the separate computing device to the multi-architecture computing device 100, or by using a network or other computer-to-computer connection to transfer the binary representations 114 to the multi-architecture computing device 100).

Figure 2:
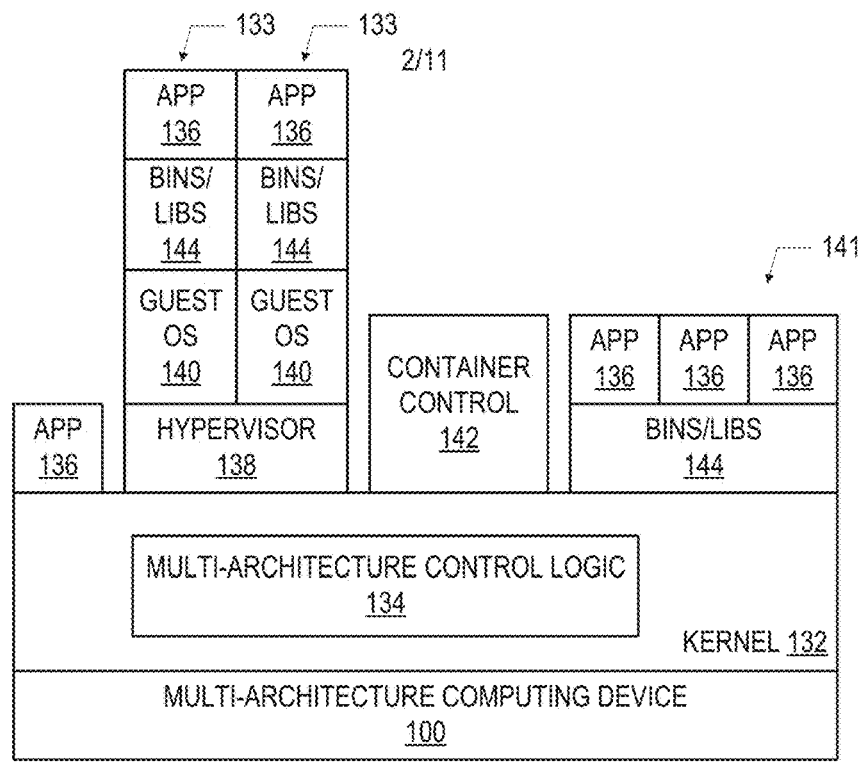
FIG. 2 is a diagram illustrating example programs that may execute on the multi-architecture computing devices disclosed herein, in accordance with various embodiments.

FIG. 2 is a diagram illustrating example programs that may execute on the multi-architecture computing devices 100 disclosed herein, in accordance with various embodiments. In particular, FIG. 2 provides examples of the kinds and hierarchy of logic that may execute on the hardware of the computing device 100, and illustrates a number of different types of programs that may run on a multi-architecture computing device 100 (e.g., serving as the program 115). The programs illustrated in FIG. 2 include an application 136 running on the kernel 132, a virtual machine 133, and a container 141; any of these programs may serve as the program 115, and any combination of one or more of these programs may run on the multi-architecture computing device 100, and may be passed between multiple processing cores 102 as disclosed herein. Generally, the multi-architecture computing device 100 may run virtual functions, applications, workloads, and data storage and collection processes (e.g., in conjunction with other multi-architecture computing devices 100 in a data center, as discussed below with reference to FIG. 19).

A kernel 132 of an operating system (OS) may execute on the computing device 100; in some embodiments, the multi-architecture control logic 134 may be implemented as part of the kernel 132. The kernel 132 may be a multi-architecture binary, and may be loaded by the computing device 100 with a dynamic loader executing N different times with a different set of library binaries for each ISA in order to load N kernel images, each associated with a different one of the N ISAs. One boot segment may be shared among the different kernel images. As shown, an application 136 may run within the operating system of the kernel 132. The application 136 may include any kind of data processing (e.g., image processing, audio processing, text processing, mathematical processing, machine learning, simulation), communication (e.g., network communication, voice or video communication), storage, or other kind of application.

In some embodiments, one or more virtual machines 133 may run on the multi-architecture computing device 100. As known in the art, each virtual machine 133 may provide a separate instantiation of a guest operating system 140, binaries/libraries 144, and applications 136 running on top of the guest operating system 140. The applications 136 running in the virtual machines 133 may be any suitable application, such as video caching, transcoding, etc. In some embodiments, a virtual machine 133 may utilize a set of OpenStack Services running on a hypervisor (or virtual machine manager) 138.

In some embodiments, one or more containers 141 may run on the multi-architecture computing device 100. A container control application (e.g., a docker daemon) 142 may manage the creation and operation of the containers 141, as known in the art. A container 141 may include binaries/libraries 144 shared among one or more applications 136 running in the container 141.

Figure 3:
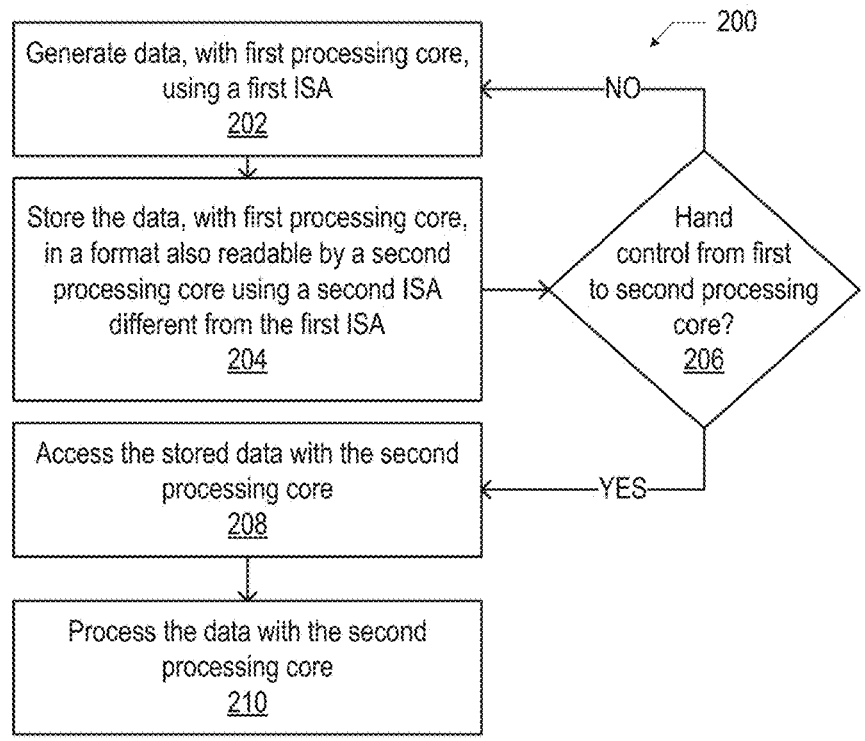
FIG. 3 is a flow diagram of an illustrative method of handling data across processing cores having different instruction set architectures (ISAs), in accordance with various embodiments.

FIG. 3 is a flow diagram of an illustrative method 200 of handling data across processing cores having different instruction set architectures (ISAs), in accordance with various embodiments. Although the operations of the method 200 may be discussed as performed by, and with respect to, various components of the multi-architecture computing device 100 of FIG. 1, the method 200 may be performed by any suitable computing device or devices.

At 202, a first processing core, using a first ISA, may generate data. The data may be any data generated by execution of a program, such as the value of variables, image or text data, settings, program state data, user data, network data, or any other data. For example, a processing core 102-K, with an ISA K, may generate data by executing a binary representation 114-K (e.g., as part of a multi-architecture binary executable 116, or as a stand-alone binary executable) corresponding to a program 115.

At 204, the first processing core may store the data in a format also readable by a second processing core having a second ISA, different from the first ISA. For example, the processing core 102-K, with an ISA K, may store the data as multi-architecture compatible data 126 in the system memory 128 so that it is readable by a processing core 102-J with an ISA J.

At 206, a determination may be made as to whether execution should be handed from the first processing core to the second processing core. For example, the multi-architecture control logic 134 may determine whether to hand operation of a program 115 from the processing core 102-K to the processing core 102-J. The multi-architecture control logic 134 may collect and store data that may be used to make the determination at 206. For example, in some embodiments, the multi-architecture control logic 134 may determine to hand operation of a program 115 from a lower-power processing core 102 to a higher-power processing core 102 upon determining that a resource demand exceeds a threshold. The resource demand may be a demand for computing cycles, complex operations, or any other resource that would be best provided by a higher-power processing core 102. For example, in some embodiments, the multi-architecture control logic 134 may determine to hand operation of a program 115 from a lower-power processing core 102 to a higher-power processing core 102 upon determining that the number of client devices 186 (discussed below with reference to FIG. 19) requesting a service from the multi-architecture computing device 100, or that a network traffic volume, exceeds a threshold. Any other resource demand evaluation technique may be used in the determination of 206.

If the determination is made at 206 that control is not to be handed to the second processing core, the method 200 may return to 202. If the determination is made at 206 that control is to be handed to the second processing core, the method may proceed to 208 and the second processing core may access the stored data. For example, the processing core 102-J may access some of the multi-architecture compatible data 126 in the system memory 128. In some embodiments, the operations performed at 208 may include halting the execution of a program 115 on the first processing core (e.g., by halting execution of the corresponding binary representation 114-K with the processing core 102-K).

At 210, the second processing core may process the data. For example, the processing core 102-J may execute a binary representation 114-J (e.g., as part of a multi-architecture binary executable 116, or as a stand-alone binary executable) corresponding to the program 115 to resume operation of the program 115, using some of the multi-architecture compatible data 126.

Figure 4:
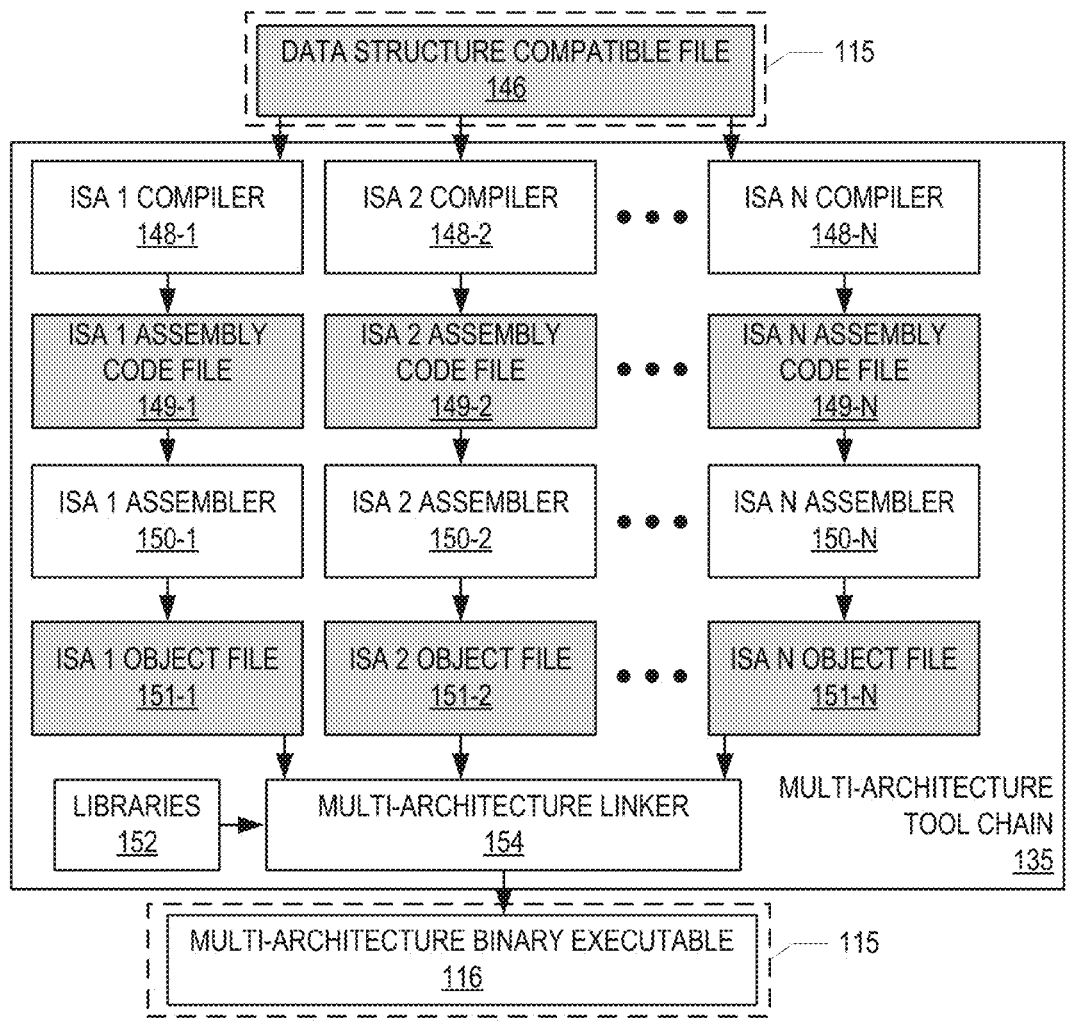
FIG. 4 illustrates example logic and techniques for the generation of a multi-architecture binary executable, in accordance with various embodiments.

As discussed above, in some embodiments of the multi-architecture computing device 100, multiple binary representations 114 representing the same program, but for different ISAs, may be included in a multi-architecture binary executable 116 stored in the system memory 128. FIG. 4 illustrates example logic and techniques for the generation of a multi-architecture binary executable 116 by the multi-architecture toolchain 135, in accordance with various embodiments. As noted above, in some embodiments, the multi-architecture toolchain 135 may be part of the computing device 100, or may be part of a separate computing device. More generally, the operations of the multi-architecture toolchain 135 may be said to be performed "offline" (as opposed to at load time of the program 115).

In particular, FIG. 4 illustrates a compiler 148 and an assembler 150 for each of the ISAs in the multi-architecture computing device. The compilers 148 and the assemblers 150 may be part of the multi-architecture toolchain 135. A data structure compatible file 146 may be provided to the compilers 148 (i.e., the ISA 1 compiler 148-1, the ISA 2 compiler 148-2, ..., and the ISA N compiler 148-N). The data structure compatible file 146 may be a code file, representative of the program 115, written in a high-level programming language (e.g., C or C++) that generates and uses data structures that are compatible with the ISAs 1, 2, ..., N (e.g., as discussed above with reference to the multi-architecture compatible data 126). Each of the compilers 148 may compile the data structure compatible file 146 in accordance with its associated ISA to generate an assembly code file 149 representative of the program 115. In some embodiments, each of the compilers 148 may perform a conversion operation at compile time to convert the endianness of the data structure compatible file 146 into the endianness appropriate for the corresponding ISA. Each assembly code file 149 may be provided to its associated assembler 150, and the assembler 150 may assemble the assembly code file 149 in accordance with its associated ISA to generate an object file 151 (in machine code) representative of the program 115. An object file 151 may include the program instructions and data, as well as debug data. The debug data may include information necessary for a debugger or exception handler to unwind (or "unroll") the program 115 back to the state of the machine registers and stack at any point higher up in the call stack, and may include information about the locations of handlers to control where the unwinding stops. In some embodiments, the debug data may include code in the DWARF format. The debug data in an object file 151 may provide the debug data 176, discussed below with reference to FIGS. 11-13. Not shown in FIG. 4 is a preprocessor, which may be included in some embodiments to expand macro definitions, include statements, or replace other shortcuts in the data structure compatible file 146 before reaching the compiler 148. The FIG. 4 also illustrates a multi-architecture linker 154. The multi-architecture linker 154 may be part of the multi-architecture toolchain 135. The multi-architecture linker 154 may access all of the object files 151 (as well as any relevant libraries 152, such as dynamic link libraries), and may link the binary representations 114 into the multi-architecture binary executable 116. As noted above, in some embodiments, the multi-architecture control logic 134 may not link the binary representations 114 into a multi-architecture binary executable 116, and thus may not include a multi-architecture linker 154. Instead, each of the object files 151 may be separately linked with libraries (and other support files, as appropriate) to generate separate binary representations 114 that are themselves binary executables. The output of the multi-architecture toolchain 135 (e.g., separately linked object files 151, or a multi-architecture binary executable 116) may be provided to and stored in the system memory 128, as discussed above. When the multi-architecture toolchain 135 is part of a computing device that is separate from the multi-architecture computing device 100, the output of the multi-architecture toolchain 135 may be transferred to the system memory 128 of the computing device 100 in any suitable manner (e.g., by computer readable media or network connections, as discussed above).

When multiple binary representations 114 for multiple different ISAs are included in a multi-architecture binary executable 116, the multi-architecture control logic 134 may include a dynamic loader to selectively load the appropriate binary representation 114 for a particular processing core 102. For example, FIG. 5 illustrates the loading of different binary representations 114 for execution from a multi-architecture binary executable 116, in accordance with various embodiments. FIG. 5 illustrates a dynamic loader 160 to load different binary representations 114 (each associated with a different one of the ISAs 1, 2, ..., N) in a multi-architecture binary executable 116. The dynamic loader 160 may be part of the multi-architecture control logic 134. The dynamic loader 160 may access (e.g., read from the system memory 128) the multi-architecture binary executable 116, and load the appropriate binary representation 114 based on a control signal provided to the dynamic loader 160 (e.g., from the scheduling logic 194 of the multi-architecture control logic 134, discussed below). For example, the dynamic loader 160 may load the binary representation 114-1 for execution by the processing core 102-1, the dynamic loader 160 may load the binary representation 114-2 for execution by the processing core 102-2, etc.

During operation, the dynamic loader 160 may process the multi-architecture binary executable 116 once for each of the different ISAs represented therein to load the different binary representations 114. In some embodiments, the dynamic loader 160 may identify the desired binary representation 114 by comparing the ISA specified in the control signal to the ISA name included in an ELF section header; the dynamic loader 160 may load the binary representation 114 in the ELF section whose name matches an identifier of the ISA specified in the control signal. The dynamic loader 160 may also use relevant libraries 162 (such as dynamic link libraries), as known in the art. In embodiments of the multi-architecture computing device 100 in which no multi-architecture binary executable 116 is used, the dynamic loader 160 may separately recognize the appropriate binary representation 114 for an associated processing core 102. The dynamic loader 160 may read the binary representation 114, create an address space, initialize a register set, and execute a jump to the first instruction in the program 115.

FIG. 6 is a flow diagram of an illustrative method 210 of compiling and assembling a file in a multi-architecture computing device, in accordance with various embodiments. Although various operations of the method 210 may be illustrated with reference to various elements of a multi-architecture computing device 100, any suitable computing device may perform the method 210.

At 212, a file may be accessed (e.g., read). The file may have data structures compatible with multiple ISAs. For example, the data structure compatible file 146 may be accessed (e.g., from a memory, such as the system memory 128) by an ISA K compiler 148-K of a multi-architecture toolchain 135.

At 214, the file may be compiled in accordance with a first ISA to generate an assembly code file. For example, the ISA K compiler 148-K of the multi-architecture toolchain 135 may compile the data structure compatible file 146 to generate an assembly code file 149-K in accordance with the ISA K.

At 216, the assembly code file may be assembled in accordance with the first ISA to generate an object file. For example, the ISA K assembler 150-K of the multi-architecture toolchain 135 may assemble the assembly code file 149-K in accordance with the ISA K to generate the object file 151-K.

At 218, the object file may be accessed by a multi-architecture linker. For example, the object file 151-K (generated by the ISA K assembler 150-K) may be stored in a memory (e.g., the system memory 128) and accessed by the multi-architecture linker 154 of the multi-architecture toolchain 135. Note that, in some embodiments, the method 210 may be performed in series, in parallel, or in any suitable combination for multiple different ISAs; thus, the multi-architecture linker 154 may access object files assembled in accordance with multiple different ISAs.

FIG. 7 is a flow diagram of an illustrative method 220 of generating a multi-architecture binary executable, in accordance with various embodiments. Although various operations of the method 220 may be illustrated with reference to various elements of a multi-architecture computing device 100, any suitable computing device may perform the method 220. In some embodiments, the method 220 may be performed subsequent to the performance of the method 210.

At 222, multiple object files may be accessed. Each object file may be associated with a different ISA. For example, the multi-architecture linker 154 of a multi-architecture toolchain 135 may access object files 151 generated by each of multiple assemblers 150 (e.g., an object file 151-1 generated by the ISA 1 assembler 150-1, an object file 151-2 generated by the ISA 2 assembler 150-2, . . . , an object file 151-N generated by the ISA N assembler 150-N). These object files may be stored in a memory (e.g., the system memory 128). An object file associated with a particular ISA may be, or may be included in, the binary representation 114 associated with that particular ISA.

At 224, a multi-architecture binary executable may be generated. The multi-architecture binary executable may include the multiple object files. For example, the multi-architecture linker 154 of the multi-architecture toolchain 135 may generate the multi-architecture binary executable 116 using the multiple object files 151 (and, e.g., libraries 152 and any other associated support files).

FIG. 8 is a flow diagram of an illustrative method 230 of loading a binary representation from a multi-architecture binary executable, in accordance with various embodiments. Although various operations of the method 230 may be illustrated with reference to various elements of a multi-architecture computing device 100, any suitable computing device may perform the method 230. In some embodiments, the method 230 may be performed subsequent to the performance of the method 220.

At 232, a multi-architecture binary executable may be accessed. For example, a dynamic loader 160 of a multi-architecture control logic 134 may access a multi-architecture binary executable 116 stored in the system memory 128.

At 234, a binary representation may be loaded for a particular ISA represented in the multi-architecture binary executable. For example, the dynamic loader 160 of the multi-architecture control logic 134 may generate the binary representation 114-J from the multi-architecture binary executable 116 (e.g., in response to a control signal requesting loading of the binary representation 114-J or indicating that a processing core 102-J with the ISA J will run the program 115).

Figure 9:
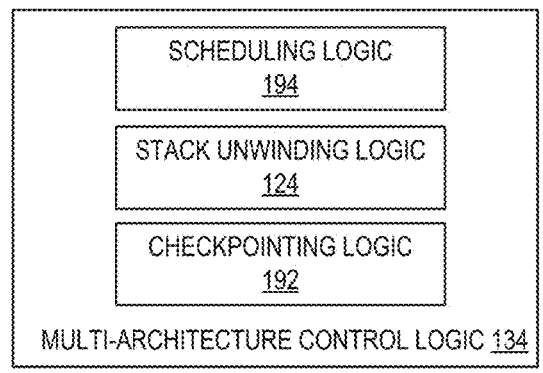
FIG. 9 is a block diagram of components that may be included in example multi-architecture control logic, in accordance with various embodiments.

A number of components are described herein as potentially being included in the multi-architecture control logic 134. FIG. 9 is a block diagram of some particular components that may be included in the multi-architecture control logic 134, in accordance with various embodiments. In the block diagram of FIG. 9, the multi-architecture control logic 134 is shown to include scheduling logic 194, stack unwinding logic 124, and checkpointing logic 192.

The scheduling logic 194 of the multi-architecture control logic 134 may control where a program 115 is executed among multiple processing cores 102. The scheduling logic 194 may be able to allocate work to the processing cores 102 at the process/thread level, and may do so based on assessment of the resource demand on the multi-architecture computing device 100. For example, the determination discussed above with reference to 206 of FIG. 3 may be performed by the scheduling logic 194. The scheduling logic 194 may implement any known techniques for selecting which of multiple processing cores 102 should handle execution of a program 115 (e.g., given demand and resource constraints, such as traffic volume); the systems and techniques disclosed herein provide ways of enabling the handoff of the program 115 among processing cores 102 having different architectures. In some embodiments, the scheduling logic 194 may be part of the operating system of the multi-architecture computing device 100. In some embodiments, the scheduling logic 194 I may include policy logic that determines whether the program 115 should be moved, and moving logic that controls the transfer of the program 115 to a new processing core 102; each of these may take any suitable form.

The checkpointing logic 192 of the multi-architecture control logic 134 may control a checkpointing process used to record the state of a program 115 executing on a particular processing core 102-K so that the program 115 can be halted on the processing core 102-K and resumed on another processing core 102-J. Conventional checkpointing is a method that improves fault tolerance of a program running on a processor by enabling the program to restore on that processor to a known good state, and infrastructure for controlling the checkpointing process may be included in an operating system. For example, the Linux userspace checkpointing infrastructure may, among other things, capture and restore the kernel context of a program (e.g., the state of file handles, transmission control protocol (TCP) or other network connections, security contexts, etc.). The data captured during checkpointing (and used to restore a program) may be referred to herein as "checkpoint data."

As disclosed herein, checkpointing techniques may be modified to enable a program 115 to halt on one processing core 102 and resume on another processing core 102 with a different ISA. In some embodiments (e.g., as discussed below with reference to FIG. 10), the checkpoint data may be stored in a format readable by multiple ISAs, and thus may be among the multi-architecture compatible data 126. In other embodiments, the checkpoint data may not be stored in a format readable by multiple ISAs; instead, the checkpoint data may be translated (e.g., by a data translation processing device, as discussed below with reference to FIGS. 14-17).

Figure 10:
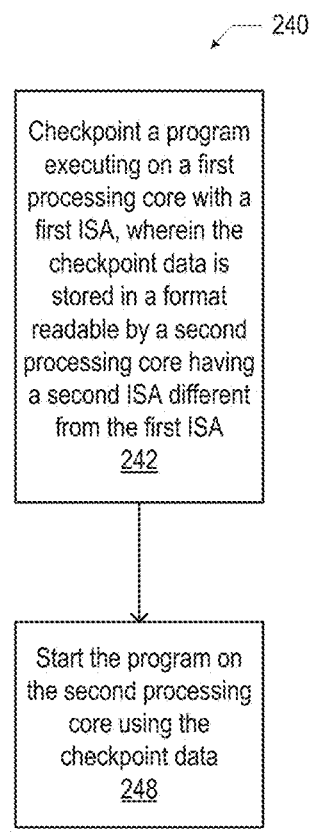
FIG. 10 is a flow diagram of a method of transferring execution of a program across processing cores having different ISAs using checkpointing, in accordance with various embodiments.

FIG. 10 is a flow diagram of a method 240 of transferring execution of a program across processing cores having different ISAs using checkpointing, in accordance with various embodiments. Although various operations of the method 240 may be illustrated with reference to various elements of a multi-architecture computing device 100, any suitable computing device may perform the method 240.

At 242, a program may be checkpointed while executing on a first processing core having a first ISA. In the method 240, checkpointing the program may include storing checkpoint data for the program in a format readable by a second processing core having a second ISA different from the first ISA. For example, the program 115 may be executing on the processing core 102-J (e.g., via the binary representation 114-J) when the checkpointing logic 192 causes a checkpoint to be stored as multi-architecture compatible data 126. The checkpoint data may include a snapshot of the state of operation of the program 115, and may be generated in accordance with any existing checkpointing technique (e.g., any technique performed by a program and/or an operating system, or otherwise performed in any combination of the userspace and kernel). The checkpoint data may include data representative of the state of the program 115 to allow the program 115 to be restored as a fully functioning exact copy. The checkpoint may be triggered by the operating system, by the program itself, or both, for example.

At 244, the program may be executed by the second processing core using the checkpoint data. For example, the checkpointing logic 192 may cause the program 115 to be started by a processing core 102-K (e.g., by executing the binary representation 114-K) starting from the checkpoint represented by the checkpoint data.

In some embodiments, the program 115 may signal to the checkpointing logic 192 when it is executing a return path from a system call (e.g., a call into the kernel code), and in response, the checkpointing logic 192 may generate a full or partial checkpoint. This may result in the creation of a checkpoint when the program context may change, and thus may improve the performance of the checkpoint-and-restore systems and techniques disclosed herein. In some embodiments, the checkpointing logic 192 (e.g., part of the OS or provided by an add-on library) may use system calls as hooks for where the state of the program 115 may be readily captured.

Figure 11:
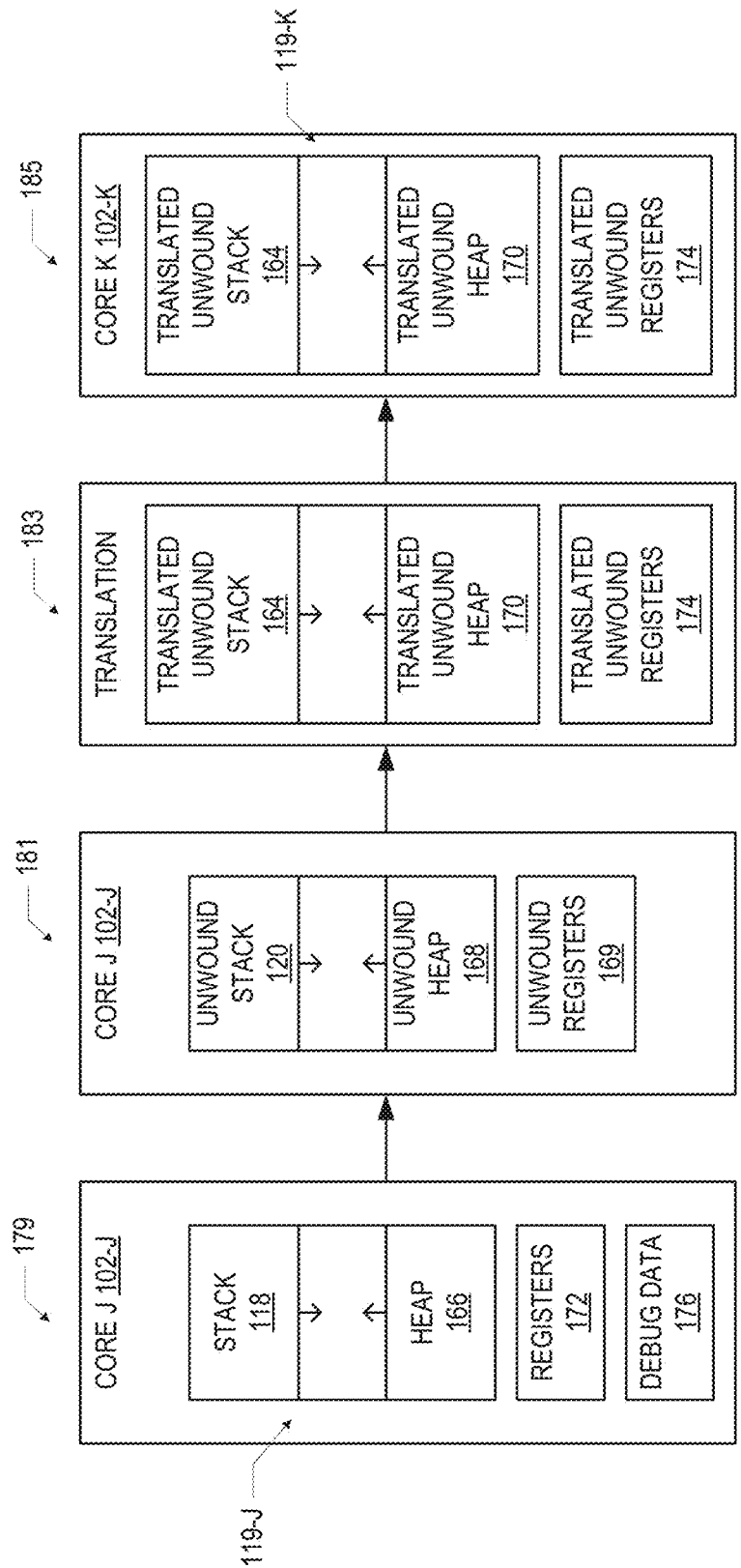
FIG. 11 illustrates transferring a program across processing cores having different ISAs using stack unwinding, in accordance with various embodiments

Returning to FIG. 9, as noted above, the multi-architecture control logic 134 may include stack unwinding logic 124. The stack unwinding logic 124 may control a stack unwinding process used to hold the program 115 executing on a particular processing core 102-K and resume that program 115 on another processing core 102-J. FIG. 11 illustrates transferring a program across processing cores having different ISAs using stack unwinding, in accordance with various embodiments. The operations discussed below with reference to FIG. 11 may be controlled by the stack unwinding logic 124, as described.

In particular, FIG. 11 illustrates various phases in the transfer of execution of a program 115 from a processing core 102-J to a processing core 102-K. In phase 179, the multi-architecture control logic 134 (e.g., the stack unwinding logic 124) may halt operation of the program 115 on the processing core 102-J (e.g., by halting execution of the binary representation 114-J). The processing core 102-J may maintain a program stack 119-J for the program 115 including stack data 118 and heap data 166 (stored, e.g., in the system memory 128). The processing core 102-J may also store register data 172 related to the program 115 (e.g., in the registers 106-J).

Additionally, debug data 176 associated with the operation of the program 115 on the processing core 102-J may be stored in the system memory 128. As discussed above, the debug data 176 may be created by a compiler 148 of the multi-architecture toolchain 135. The debug data 176 may include information that may be used by a debugger or an exception handler to roll the state of the program 115 back to a previous state in the execution history of the program 115 (e.g., the last function call). The debug data 176 may include, for example, information related to which shortcuts were performed during execution of the program 115. Examples of the debug data 176 may include any of the debug data discussed above with reference to the object files 151.

In phase 181, the multi-architecture control logic 134 (e.g., the stack unwinding logic 124) may cause the program stack 119-J to unwind to a previous function call. The unwinding of the program stack 119-J may be performed using any techniques conventionally used in debuggers and exception handlers to return the stack to the previous state (e.g., the last function call). In some embodiments, the stack unwinding logic 124 may use the debug data 176 to perform the unwinding (e.g., as used by debuggers and exception handlers). After unwinding, the program stack 119-J may include unwound stack data 120, unwound heap data 168, and unwound register data 169.

In phase 183, the multi-architecture control logic 134 (e.g., the stack unwinding logic 124) may translate the data in the unwound program stack 119-J into a format readable by the processing core 102-K (e.g., readable by the ISA K). In particular, the unwound stack data 120 may be translated into translated unwound stack data 164, the unwound heap data 168 may be translated into the translated unwound heap data 170, and the translated unwound stack data 164 and the translated unwound heap data 170 may be stored in the system memory 128. The multi-architecture control logic 134 (e.g., the stack unwinding logic 124) may also translate the unwound register data 169 (in the registers 106-J) into translated unwound register data 174. The translated unwound register data 174 may be stored in the system memory 128, and may be readable by the processing core 102-K (e.g., readable by the ISA K). As discussed above, the translation may include any operations to make the translated data compatible with the ISA K (e.g., a change in endianness, a change in the word size, a change in the address space, a change in the number of operands, etc.).

In phase 185, the multi-architecture control logic 134 (e.g., the scheduling logic 194) may cause the processing core 102-K to commence operation of the program 115 (e.g., by execution of the binary representation 114-K) starting with a program stack 119-K including the translated unwound stack data 164 and the translated unwound heap data 170. The registers 106-K associated with the processing core 102-K may be populated with the translated unwound register data 174 prior to commencing execution of the program 115. In this manner, the processing core 102-K may resume operation of the program 115 where such operation left off on the processing core 102-J.

FIG. 12 is a flow diagram of an illustrative method 250 of transferring execution of a program across processing cores having different ISAs using stack unwinding, in accordance with various embodiments. Although various operations of the method 250 may be illustrated with reference to various elements of a multi-architecture computing device 100, any suitable computing device may perform the method 250.

At 252, an instruction may be received to switch execution of a program from a first processing core (with a first ISA) to a second processing core (with a second ISA different from the first ISA). For example, the scheduling logic 194 may issue an instruction to the stack unwinding logic 124 to cause the processing core 102-J to halt execution of a program 115 so that execution of the program 115 may be transferred to the processing core 102-K. A program stack 119-J may include stack data 118 and heap data 166. In some embodiments, the instruction received at 252 may not indicate which processing core will resume operation of the program, only that operation of the program on the current processing core should halt.

At 254, the program stack of the first processing core may be unwound back to a previous function call. For example, the stack unwinding logic 124 may cause the program stack 119-J associated with execution of the program 115 on the processing core 102-J may be unwound (i.e., the data included in the program stack 119-J may be changed) to represent the state of the program stack 119-J at the time of a previous function call (e.g., the most recent function call). The unwound program stack data may include unwound stack data 120 and unwound heap data 168, for example.

At 256, the unwound program stack of the first processing core may be translated into a format readable by the second processing core. For example, the scheduling logic 194 may indicate the ISA of the processing core 102 that will be resuming operation of the program 115, and the stack unwinding logic 124 may translate the data of the program stack 119-J into data that may populate a program stack 119-K for use by the processing core 102-K. The translated unwound program stack data may include translated unwound stack data 164 and translated unwound heap data 170, for example. In some embodiments, at 256, unwound data from the registers of the first processing core may be translated into data appropriate for registers of the second processing core (e.g., as discussed above with reference to the unwound register data 169 and the translated unwound register data 174 of FIG. 11). Translation may include any operations to make the translated data compatible with the ISA K (e.g., a change in endianness, a change in the word size, a change in the address space, a change in the number of operands, etc.).

At 258, the second processing core may start execution of the program using the translated unwound program stack. For example, the processing core 102-K may populate a program stack with the translated unwound stack data 164 and the translated unwound heap data 170. The processing core 102-K may also populate its registers 106-K with the translated unwound register data 174.

FIG. 13 is a flow diagram of an illustrative method 260 of translating a program stack from one ISA to another ISA, in accordance with various embodiments. Although various operations of the method 260 may be illustrated with reference to various elements of a multi-architecture computing device 100, any suitable computing device may perform the method 260. In some embodiments, the method 260 may be performed as part of the operations discussed above with reference to 256 of the method 250.

At 262, calls may be identified in an unwound program stack of a processing core having a first ISA. For example, the multi-architecture control logic 134 (e.g., the stack unwinding logic 124) may analyze the data in the unwound program stack 119-J (illustrated as part of phase 181 in FIG. 11) to identify the calls that made up the unwound program stack 119-J during execution of the program 115 by the processing core 102-J.

At 264, a program stack for a second processing core having a second ISA, different from the first ISA, may be generated using the identified calls. For example, the multi-architecture control logic 134 (e.g., the stack unwinding logic 124) may generate a program stack compatible with the second ISA by substituting each call identified at 262 with an equivalent call compatible with the second ISA.

In some embodiments, the multi-architecture control logic 134 may include both the checkpointing logic 192 and the stack unwinding logic 124, and may use both in any suitable combination to transfer execution of a program 115 from one processing core 102 to another. In such embodiments, the multi-architecture control logic 134 may perform the operations discussed above with reference to FIG. 10, as well as the operations discussed above with reference to FIGS. 11-13. For example, if execution of a program 115 on a processing core 102-J was stopped in order to move execution of that program 115 to a processing core 102-K, and no system calls had been performed since the last checkpoint (so that the kernel context had not changed since the last checkpoint), the stack unwinding techniques disclosed herein may be used to unwind to the previous state and restart the program 115 on the processing core 102-K, as described above.

In other embodiments, the multi-architecture control logic 134 may include the checkpointing logic 192 (but not the stack unwinding logic 124) or the stack unwinding logic 124 (but not the checkpointing logic 192). For example, in such embodiments, the multi-architecture control logic 134 may perform the operations discussed above with reference to FIG. 10, or the operations discussed above with reference to FIGS. 11-13, but not both. The checkpointing techniques disclosed herein may include logic in the program 115 to communicate to the checkpointing infrastructure (e.g., in the operating system) when a safe point has been reached in the processing (e.g., a point to which the program 115 may be safely rolled back); the stack unwinding techniques disclosed herein may not require such logic. Additionally, the checkpointing techniques disclosed herein incur the processing cost of generating the checkpoint data each time the program 115 is checkpointed, thus reducing overall throughput; the stack unwinding techniques disclosed herein may not incur such costs.

Figure 14:
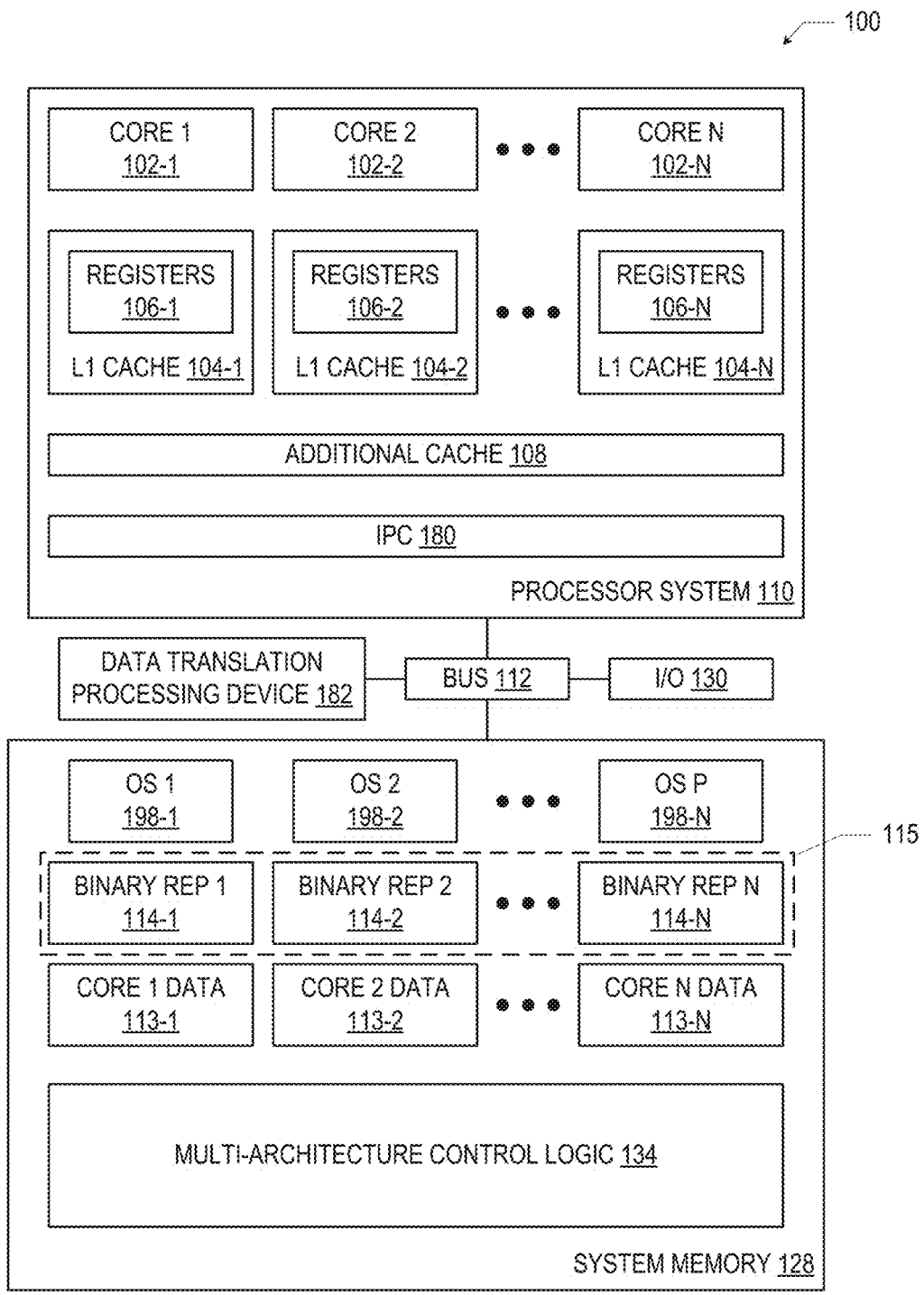
FIG. 14 is a block diagram of a multi-architecture computing device, in accordance with various embodiments.

In various embodiments discussed above, a multi-architecture computing device 100 may include multi-architecture compatible data 126 that may be used by binary representations 114 on processing cores 102 having different ISAs, thus enabling handover of the program 115 associated with the binary representations 114 between these different processing cores 102. In some embodiments, a multi-architecture computing device 100 may not include multi-architecture compatible data 126, and instead, may include a data translation processing device that may perform any necessary data structure translations as control of a program 115 is transferred between processing cores 102 having different ISAs. FIG. 14 is a block diagram of such a multi-architecture computing device 100, in accordance with various embodiments.

A number of the elements of the multi-architecture computing device 100 illustrated in FIG. 14 are shared with the multi-architecture computing device 100 of FIG. 1 (and may take the form of any of the embodiments of those elements discussed herein). However, the multi-architecture computing device 100 illustrated in FIG. 14 also includes a data translation processing device 182 coupled to the bus 112. During operation of the multi-architecture computing device 100 of FIG. 14, the translation of data structures between different ISAs of different processing cores 102 may be performed by the data translation processing device 182. For example, data generated and used by the processing core 102-1 (represented in FIG. 14 as core 1 data 113-1) may be translated, by the data translation processing device 182, into data readable by the processing core 102-2 (represented in FIG. 14 as core 2 data 113-2) so that a program 115 operating on the processing core 102-1 may be handed over to the processing core 102-2. In some embodiments, for example, the data translation processing device 182 may perform address space translations, including offset calculations and layout translations to generate a multi-architecture compatible address space representation. As noted above, translation may include any operations to make the translated data compatible with the target processing core 102 (e.g., a change in endianness, a change in the word size, a change in the address space, a change in the number of operands, etc.).

FIG. 14 also illustrates an embodiment in which different operating systems 198 control operations on different cores 102 (e.g., the operating system 198-1 is associated with the processing core 102-1, the operating system 198-2 is associated with the processing core 102-2, etc.). Different binary representations 114 may be associated with different processing cores 102, as discussed above with reference to FIG. 1. The different binary representations 114 illustrated in the system memory 128 of FIG. 14 may still represent a common program 115, but handing off operation of the program 115 between processing cores 102 may include signaling the handoff between the operating systems 198 associated with the different processing cores 102. The signaling between the operating systems 198 may be controlled by an interprocess communication (IPC) mechanism 180. The IPC mechanism 180 may take the form of any known IPC mechanism, and may include, for example, in-memory task queues, in-memory message queues, and/or inter-processor interrupts. Multi-architecture control logic 134 may control the execution of the program 115 on different processing cores 102 in any of the ways discussed above, and the data translation processing device 182 may handle any necessary data translation.

The data translation processing device 182 may be a processing device separate from any of the processing cores 102. For example, the data translation processing device 182 may be a field programmable gate array (FPGA), an application specific integrated circuit (ASIC), or other suitable processing device. The data translation processing device 182 may be mounted on a common circuit board (e.g., a motherboard) with the processing cores 102 of the multi-architecture computing device 100.

FIG. 15 is a flow diagram of an illustrative method 270 of switching operation of a program from a processing core with one ISA to a processing core with a different ISA, in accordance with various embodiments. Although various operations of the method 270 may be illustrated with reference to various elements of a multi-architecture computing device 100, any suitable computing device may perform the method 270.

At 272, an instruction may be received to switch a program from a first processing core (with a first ISA and running a first OS) to a second processing core (with a second ISA and running a second OS, different from the first ISA and the first OS, respectively). For example, the multi-architecture control logic 134 (e.g., the scheduling logic 194) may issue an instruction to cause the processing core 102-J to halt execution of a program 115 so that execution of the program 115 may be transferred to the processing core 102-K. In some embodiments, the instruction received at 272 may not indicate which processing core will resume operation of the program, only that operation of the program on the current processing core should halt.

At 274, program data from the operation of the program on the first processing core may be provided for access by a data translation processing device. For example, when a stack unwinding technique is used, program stack data (e.g., as discussed above with reference to the program stacks 119), register data (e.g., as discussed above with reference to the register data 172), and debug data (e.g., as discussed above with reference to the debug data 176) generated during operation of the program 115 on the processing core 102-K may be stored in the system memory 128, where it may be accessed by the data translation processing device 182. This program data may be stored as the core J data 113-J. In another example, when a checkpointing technique is used, checkpoint data (e.g., as discussed above with reference to the checkpointing logic 192 and method 240) may provide the program data; at 274, the checkpoint data generated during checkpointing of a program 115 on the processing core 102-K may be stored in the system memory 128, where it may be accessed by the data translation processing device 182 and then stored as the core J data 113-J.

FIG. 16 is a flow diagram of an illustrative method 280 of translating data structures compatible with one ISA into data structures compatible with another ISA in a multi-architecture computing device, in accordance with various embodiments. Although various operations of the method 280 may be illustrated with reference to various elements of a multi-architecture computing device 100, any suitable computing device may perform the method 280. In some embodiments, the method 280 may be performed subsequent to the method 270.

At 282, program data may be accessed from a memory. The program data may represent the operation of the program on a first processing core. The first processing core may have a first ISA and may be running a first OS. For example, the data translation processing device 182 may access program stack data (e.g., as discussed above with reference to the program stacks 119), register data (e.g., as discussed above with reference to the register data 172), and debug data (e.g., as discussed above with reference to the debug data 176) stored in the system memory 128 (e.g., as the core J data 113-J) after operation of a program 115 on a first processing core 102-J.

At 284, data structures in the program data may be translated from the format of the first ISA to the format of a second ISA, different from the first ISA. For example, the data translation processing device 182 may translate data structures in any of the program data discussed above (e.g., with reference to 282) to a format compatible with an ISA of a different processing core 102 (e.g., an ISA K of a processing core 102-K). The translation may include any operations to make the translated data structures compatible with the second ISA (e.g., a change in endianness, a change in the word size, a change in the address space, a change in the number of operands, etc.).

At 286, the data translation processing device may store the translated data structures in the memory. For example, subsequent to translation of data structures, the data translation processing device 182 may store the translated data in the system memory 128 (e.g., core J data 113-J may be translated into and stored as core K data 113-K).

FIG. 17 is a flow diagram of an illustrative method 290 of signaling a switch in the execution of a program from one processing core to another processing core using a different operating system, in accordance with various embodiments. Although various operations of the method 290 may be illustrated with reference to various elements of a multi-architecture computing device 100, any suitable computing device may perform the method 290.

At 292, an instruction may be received to switch a program from a first processing core (with a first ISA and running a first OS) to a second processing core (with a second ISA and running a second OS, different from the first ISA and the first OS, respectively). For example, the multi-architecture control logic 134 (e.g., the scheduling logic 194) may issue an instruction to the OS 198-J to cause the processing core 102-J to halt execution of a program 115 so that execution of the program 115 may be transferred to the processing core 102-K.

At 294, an IPC switch message may be provided to the second OS. The IPC switch message may indicate to the second OS that a second processing core associated with the second OS is to take over handling of the execution of the program (e.g., a VM, an application, or a container). For example, the IPC mechanism 180 may be used to communicate between the OS J198-J and the OS K 198-K to signal the transfer of control of the program 115 from the processing core 102-J to the processing core 102-K.

In some embodiments of the multi-architecture computing device 100 of FIG. 14, the system memory may not include N different binary representations 114, but may instead include a single binary representation of the program 115, and the data translation processing device 182 may translate each of the instructions for execution by the designated processing core 102 (and its ISA).

In some embodiments of the multi-architecture computing device 100 of FIG. 14, the data translation processing device 182 may include tables or other data structures for translating the address spaces expected by different ISAs. For example, if one ISA has a bifurcated address space (e.g., one in which the kernel space and the user space are kept separate, or bifurcated in some other manner), and another ISA does not have such a bifurcated address space, the data translation processing device 182 may translate addresses compatible with one ISA into addresses compatible with the other ISA.

Figure 18:
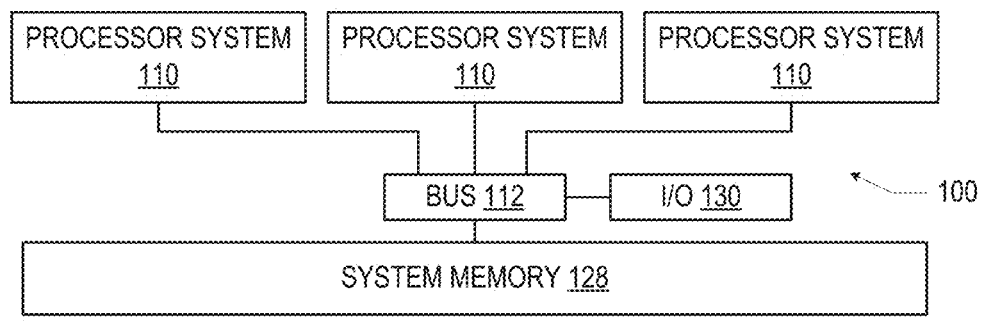
FIG. 18 is a block diagram of a multi-architecture computing device including multiple processor systems, in accordance with various embodiments.

Although FIG. 1 illustrates a multi-architecture computing device with a single processor system 110, this is simply for ease of illustration, and a multi-architecture computing device 100 may include any number of processor systems within which program control may be transferred. For example, FIG. 18 is a block diagram of a multi-architecture computing device 100 including multiple processor systems 110, in accordance with various embodiments. The processor systems 110 illustrated in FIG. 18 may have the same structure (e.g., the same numbers and ISAs of processing cores) or different structures (e.g., different numbers and ISAs of processing cores between processor systems 110). Other components included in the multi-architecture computing device 100 of FIG. 18 may include any of the components discussed above with reference to the various multi-architecture computing devices 100. Although a particular number of processor systems 110 is shown in FIG. 18, this is simply for illustration and any number of processor systems 110 may be included in a multi-architecture computing device 100.

Figure 19:
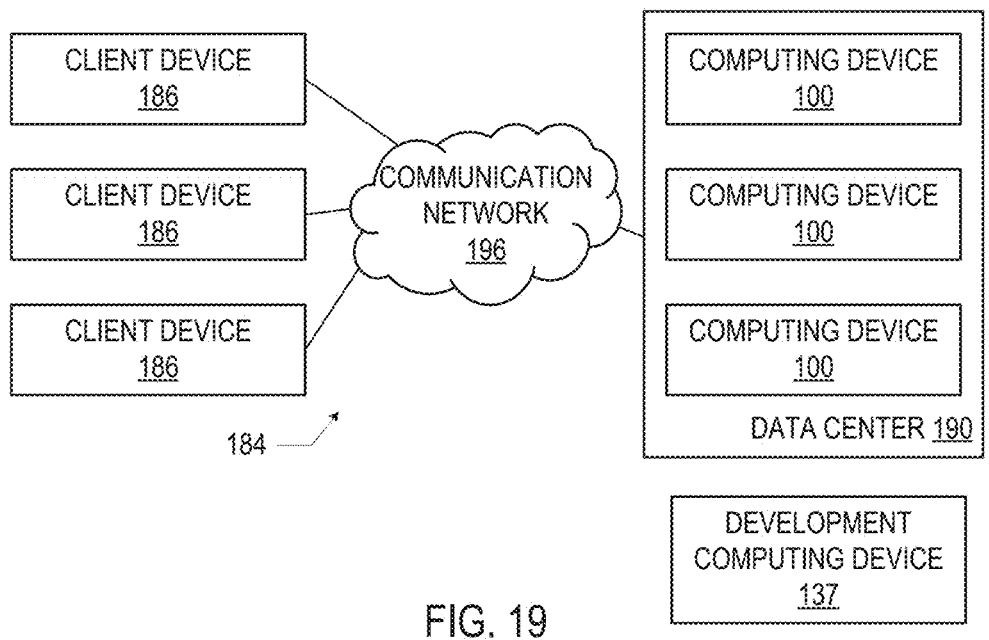
FIG. 19 is a block diagram of a computing system including a data center with multi-architecture computing devices in communication with client devices, in accordance with various embodiments.

In some embodiments, the multi-architecture computing devices 100 disclosed herein may be used in a data center application. For example, FIG. 19 is a block diagram of a computing system 184 including a data center 190 with multi-architecture computing devices 100 in communication with client devices 186, in accordance with various embodiments. The client devices 186 may communicate with the multi-architecture computing devices 100 in the data center 190 via a communication network 196. The communication network 196 may include the Internet, a wired network, a wireless network, or any combination of communication networks. The data center 190 may also include computing devices that are not multi-architecture computing devices, in addition to the multi-architecture computing devices 100. Although a particular number of client devices 186 and multi-architecture computing devices 100 are shown in FIG. 19, this is simply for illustration and any number of client devices 186 and multi-architecture computing devices 100 may be included in a computing system 184.

The computing system 184 may also include "offline" computing devices, such as one or more development computing devices 137. A development computing device 137 may be a computing device on which programs and other software tools are created for use in the computing devices 100. As discussed above, for example, the multi-architecture toolchain 135 may be part of a development computing device 137 that is not a multi-architecture computing device 100. A development computing device 137 may be remote from or otherwise entirely separate from the computing devices 100. In some embodiments, because the development computing device 137 may be used to perform compilation and other processing of complex software, the development computing device 137 may be a higher performance computing device than some or all of the computing devices 100 in the data center 190.

Any of the programs or logic described herein as being stored in a memory (e.g., the system memory 128) of a multi-architecture computing device 100 may be provided to that memory in any suitable manner. In some embodiments, the memory of the multi-architecture computing device 100 may not include these programs or logic at the time that the multi-architecture computing device 100 is manufactured or shipped to a customer. For example, in some embodiments, the multi-architecture computing device 100 may be shipped with a disk, drive, or other non-transitory computer readable media on which any of the programs or logic described herein are stored; the programs or logic may be subsequently transferred from the computer readable media into the system memory 128. In another example, the multi-architecture computing device 100 may connect to a provisioning server (e.g., a remote server) and may download any of the programs or logic described herein into the system memory 128.

Figure 20:
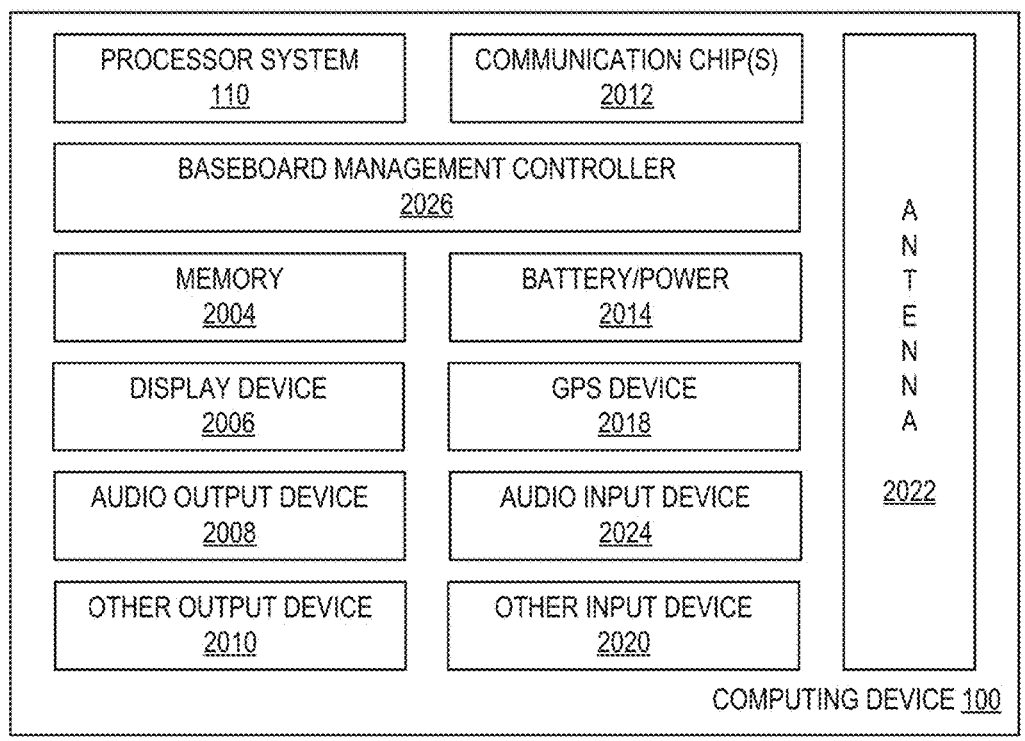
FIG. 20 is a block diagram of an example computing device, in accordance with various embodiments.

Although FIGS. 1 and 14 illustrated some particular components of multi-architecture computing devices 100, the components illustrated in FIGS. 1 and 14 are not exhaustive of all the components that may be included in a multi-architecture computing device 100. For example, FIG. 20 is a block diagram of an example computing device 100 that may serve as the multi-architecture computing device 100, in accordance with various embodiments. A number of elements are illustrated in FIG. 20 as included in the computing device 100, but any one or more of these elements may be omitted or duplicated, as suitable for the application. A bus (not illustrated in FIG. 20) may communicatively couple the elements of the computing device 100 of FIG. 20 (e.g., the bus 112).

Additionally, in various embodiments, the computing device 100 may not include one or more of the elements illustrated in FIG. 20, but the computing device 100 may include interface circuitry for coupling to the one or more elements. For example, the computing device 100 may not include a display device 2006, but may include display device interface circuitry (e.g., a connector and driver circuitry) to which a display device 2006 may be coupled. In another set of examples, the computing device 100 may not include an audio input device 2024 or an audio output device 2008, but may include audio input or output device interface circuitry (e.g., connectors and supporting circuitry) to which an audio input device 2024 or audio output device 2008 may be coupled.

The computing device 100 may include the processor system 110. As used herein, the term "processing device" or "processor" may refer to any device or portion of a device that processes electronic data from registers and/or memory to transform that electronic data into other electronic data that may be stored in registers and/or memory. The processor system 110 may include multiple processing cores having different ISAs (as discussed above), and may include also other processors, such as one or more digital signal processors (DSPs), ASICs, central processing units (CPUs), graphics processing units (GPUs), cryptoprocessors, server processors, or any other suitable processing devices. The computing device 100 may include a memory 2004, which may itself include one or more memory devices such as volatile memory (e.g., dynamic random access memory (DRAM)), non-volatile memory (e.g., read-only memory (ROM)), flash memory, solid state memory, SES, and/or a hard drive. For example, the memory 2004 may include the system memory 128.

The computing device 100 may include a baseboard management controller (BMC) 2026. The BMC 2026 is a specialized microcontroller that reads the output of sensors monitoring operational conditions of the computing device 100 (e.g., temperature, fan speeds, power consumption) and manages the interface between system-management software and platform hardware based on these readings to maintain an acceptable operating environment. Different BMCs 2026 in different computing devices 100 (e.g., in a data center 190) may communicate with each other, and remote administrators may communicate directly with the BMC 2026 to perform administrative operations. In some embodiments, the BMC 2026 may be coupled to a same circuit board (e.g., motherboard) as the processing cores 102 in the processor system 110.

In some embodiments, the computing device 100 may include a communication chip 2012 (e.g., one or more communication chips). For example, the communication chip 2012 may be configured for managing wired or wireless communications for the transfer of data to and from the computing device 100. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 2012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2012 may operate in accordance with a Global System for Mobile communication (GSM), General Packet Radio Service (GPRS), Universal Mobile Telecommunications System (UMTS), High Speed Packet Access (HSPA), Evolved HSPA (E-HSPA), or LTE network. The communication chip 2012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2012 may operate in accordance with other wireless protocols in other embodiments. The computing device 100 may include an antenna 2022 to facilitate wireless communications and/or to receive other wireless communications (such as AM or FM radio transmissions). In some embodiments, the computing device 100 may not include an antenna, nor wireless communication capability.

In some embodiments, the communication chip 2012 may manage wired communications, such as electrical, optical, or any other suitable communication protocols (e.g., Ethernet, Infiniband, other high performance computing (HPC) interconnects, or on-board fabrics such as QuickPath Interconnect (QPI)). The communication chip 2012 may be included in a network interface controller (NIC). As used herein, when the computing device 100 is a server, the computing device 100 may include at least the processor system 110 and a NIC. As noted above, the communication chip 2012 may include multiple communication chips. For instance, a first communication chip 2012 may be dedicated to shorter-range wireless communications such as Wi-Fi or Bluetooth, and a second communication chip 2012 may be dedicated to longer-range wireless communications such as a global positioning system (GPS), EDGE, GPRS, CDMA, WiMAX, LTE, EV-DO, or others. In some embodiments, a first communication chip 2012 may be dedicated to wireless communications, and a second communication chip 2012 may be dedicated to wired communications.

The computing device 100 may include battery/power circuitry 2014. The battery/power circuitry 2014 may include one or more energy storage devices (e.g., batteries or capacitors) and/or circuitry for coupling elements of the computing device 100 to an energy source separate from the computing device 2000 (e.g., AC line power).

The computing device 100 may include a display device 2006 (or corresponding interface circuitry, as discussed above). The display device 2006 may include any visual indicators, such as a heads-up display, a computer monitor, a projector, a touchscreen display, a liquid crystal display (LCD), a light-emitting diode display, or a flat panel display, for example.

The computing device 100 may include an audio output device 2008 (or corresponding interface circuitry, as discussed above). The audio output device 2008 may include any device that generates an audible indicator, such as speakers, headsets, or earbuds, for example.

The computing device 100 may include an audio input device 2024 (or corresponding interface circuitry, as discussed above). The audio input device 2024 may include any device that generates a signal representative of a sound, such as microphones, microphone arrays, or digital instruments (e.g., instruments having a musical instrument digital interface (MIDI) output).

The computing device 100 may include a global positioning system (GPS) device 2018 (or corresponding interface circuitry, as discussed above). The GPS device 2018 may be in communication with a satellite-based system and may receive a location of the computing device 100, as known in the art.

The computing device 100 may include an other output device 2010 (or corresponding interface circuitry, as discussed above). Examples of the other output device 2010 may include an audio codec, a video codec, a printer, a wired or wireless transmitter for providing information to other devices, or an additional storage device.

The computing device 100 may include an other input device 2020 (or corresponding interface circuitry, as discussed above). Examples of the other input device 2020 may include an accelerometer, a gyroscope, an image capture device, a keyboard, a cursor control device such as a mouse, a stylus, a touchpad, a bar code reader, a Quick Response (QR) code reader, any sensor, or a radio frequency identification (RFID) reader.

Any of the computing devices 100 disclosed herein may be implemented with a disaggregated architecture. For example, a computing device 100 may be implemented by different devices (e.g., different processing devices, different memory devices, and/or different network communication devices, etc.) on different racks in a datacenter, or across data centers, in communication with each other via any suitable fabric (e.g., electrical or optical buses). Although various ones of the figures may illustrate a computing device 100 as a monolithic device, this is simply for ease of illustration, and a computing device 100 may be disaggregated in any suitable manner. In some embodiments, different ones of the processing cores 102 in a computing device 100 may be in different racks in a datacenter, or in different datacenters (and execution of a program may be transferred between these different processing cores 102, as described herein). In some embodiments, the system memory 128 of a computing device 100 may be provided by multiple memory devices in different racks in a data center and/or in different datacenters.

The following paragraphs provide examples of various embodiments disclosed herein.

Example A1 is a computing device, including: a processor system including at least one first processing core having a first instruction set architecture (ISA), and at least one second processing core having a second ISA different from the first ISA; and a memory device coupled to the processor system, wherein the memory device has stored thereon a first binary representation of a program for the first ISA and a second binary representation of the program for the second ISA, and the memory device has stored thereon data for the program having an in-memory representation compatible with both the first ISA and the second ISA.

Example A2 may include the subject matter of Example A1, and may further specify that the data is data generated by execution of the program by the at least one first processing core.

Example A3 may include the subject matter of any of Examples A1-2, and may further specify that the first ISA is a complex instruction set computing (CISC) architecture, and the second ISA is a reduced instruction set computing (RISC) architecture.

Example A4 may include the subject matter of any of Examples A1-3, and may further specify that the first ISA and the second ISA have different word sizes.

Example A5 may include the subject matter of any of Examples A1-4, and may further specify that the first ISA and the second ISA have different endianness.

Example A6 may include the subject matter of any of Examples A1-5, and may further include scheduling logic to halt execution of the program by the at least one first processing core and start execution of the program by the at least one second processing core, wherein execution of the program by the at least one second processing core includes reading the data.

Example A7 may include the subject matter of Example A6, and may further specify that the scheduling logic is included in an operating system, and the operating system is to control operation of the at least one first processing core and the at least one second processing core.

Example A8 is a method of operating a computing device, including: generating data, using a first processing core with a first instruction set architecture (ISA); storing the data, with the first processing core, in a format readable by a second processing core with a second ISA different from the first ISA; accessing the stored data with the second processing core; and processing the data with the second processing core.

Example A9 may include the subject matter of Example A8, and may further specify that the first ISA has a first set of operation codes, the second ISA has a second set of operation codes, the first set is not a proper subset of the second set, and the second set is not a proper subset of the first set.

Example A10 may include the subject matter of any of Examples A8, and may further specify that the data includes register data.

Example A11 may include the subject matter of any of Examples A8, and may further specify that the data includes stack data or heap data.

Example A12 may include the subject matter of any of Examples A8-11, and may further specify that generating data using the first processing core includes operating a virtual machine (VM) or a container with the first processing core.

Example A13 may include the subject matter of Example A12, and may further specify that processing the data with the second processing core includes resuming operation of the VM or container with the second processing core after halting operation of the VM or container with the first processing core.

Example A14 may include the subject matter of any of Examples A8-13, and may further specify that generating data using the first processing core includes responding to a network service request with the first processing core.

Example A15 is one or more computer readable media (e.g., non-transitory computer readable media) having instructions thereon that, in response to execution by one or more processing devices of a computing device, cause the computing device to: cause a first processing core to execute a program, wherein the first processing core has a first instruction set architecture (ISA); cause the first processing core to halt execution of the program; and after causing the first processing core to halt execution of the program, cause a second processing core to execute the program, wherein the second processing core has a second ISA different from the first ISA, and causing the second processing core to execute the program includes causing the second processing core to read and use data compatible with the first and second ISA that is stored in the memory device by the first processing core during execution of the first program.

Example A16 may include the subject matter of Example A15, and may further specify that the first processing core has lower power consumption than the second processing core.

Example A17 may include the subject matter of any of Examples A15-16, and may further specify that the instructions are further to, in response to execution by one or more processing devices of a computing device, cause the computing device to run an operating system using the first processing core and the second processing core.

Example A18 may include the subject matter of any of Examples A15-17, and may further specify that the instructions are further to, in response to execution by one or more processing devices of the computing device, cause the computing device to prior to causing the first processing core to halt execution of the program, determine that a resource demand exceeds a threshold.

Example A19 may include the subject matter of Example A18, and may further specify that the resource demand is a client demand on a server resource.

Example A20 is a server system, including: a first processing core having a first instruction set architecture (ISA), and a second processing core having a second ISA different from the first ISA; a baseboard management controller (BMC) coupled to the first processing core and the second processing core; a memory device coupled to the BMC, wherein a first binary representation of a program and a second binary representation of the program are stored in the memory device, the first binary representation of the program is compatible with the first ISA, the second binary representation of the program is compatible with the second ISA; wherein an operating system of the server system is to cause the first processing core to run the program using the first binary representation, cause the first processing core to halt execution of the program, and, after causing the first processing core to halt execution of the program, cause a second processing core to run the program using the second binary representation stored in the memory device to resume the program.

Example A21 may include the subject matter of Example A20, and may further specify that the first processing core and the second processing core are both coupled to a motherboard.

Example A22 may include the subject matter of Example A21, and may further specify that a plurality of processing cores having the first ISA are coupled to the motherboard.

Example A23 may include the subject matter of any of Examples A20-22, and may further include a network interface to communicate with a client device via a computing network.

Example A24 may include the subject matter of any of Examples A20-23, and may further specify that the first processing core, second processing core, BMC, and memory device are included in a first server device in a first server housing, and the BMC is wired to another service device in a second server housing different from the first server housing.

Example A25 may include the subject matter of any of Examples A20-24, and may further specify that the program includes a virtual machine (VM), a container, or an application.

Example A26 is one or more computer readable media (e.g., non-transitory computer readable media) having instructions thereon that, in response to execution by one or more processing devices of a computing device, cause the computing device to perform the method of any of Examples A8-14.

Example A27 is a computing device including means for performing the method of any of Examples A8-A14.

Example B1 is a computing device, including: a processor system; a memory device coupled to the processor system, wherein a first binary representation of a program and a second binary representation of the program are stored in the memory device; and a multi-architecture linker, to operate on the processor system to link the first binary representation and the second binary representation into one multi-architecture binary executable, wherein the first binary representation is in accordance with a first instruction set architecture (ISA), the second binary representation is in accordance with a second ISA different from the first ISA, and the first binary representation and the second binary representation utilize at least one data structure compatible with both the first ISA and the second ISA.

Example B2 may include the subject matter of Example B1, and may further specify that the multi-architecture binary executable includes a first executable and linkable format (ELF) section for the first binary representation and a second ELF section for the second binary representation.

Example B3 may include the subject matter of any of Examples B1-2, and may further specify that the multi-architecture binary executable includes a first function having a name denoting the first ISA, and a second function having a name denoting the second ISA.

Example B4 may include the subject matter of any of Examples B1-3, and may further specify that the multi-architecture binary executable is stored in the memory device.

Example B5 may include the subject matter of any of Examples B1-4, and may further specify that the first ISA is a complex instruction set computing (CISC) architecture, and the second ISA is a reduced instruction set computing (RISC) architecture.

Example B6 may include the subject matter of any of Examples B1-5, and may further specify that the first ISA and the second ISA have different word sizes, or the first ISA and the second ISA have different endianness.

Example B7 may include the subject matter of any of Examples B1-6, and may further include: a first compiler to operate on the processor system to generate a first assembly file from a C code file; a second compiler to operate on the processor system to generate a second assembly file from the C code file; a first assembler to operate on the processor system to generate an object file associated with the first binary representation from the first assembly file; and a second assembler to operate on the processor system to generate an object file associated with the second binary representation from the second assembly file.

Example B8 is a computing device, including: a processor system including a first processing core having a first instruction set architecture (ISA) and a second processing core having a second ISA different from the first ISA; a memory device coupled to the processor system, wherein a first binary representation of a program and a second binary representation of the program are stored in the memory device; and a dynamic loader to operate on the processor system to, when the first processing core is to run the program, selectively load the first binary representation to run the program with the first processing core.

Example B9 may include the subject matter of Example B8, and may further specify that the dynamic loader is further to, when the second processing core is to run the program, selectively load the second binary representation to run the program with the second processing core.

Example B10 may include the subject matter of any of Examples B8-9, and may further specify that the computing device further includes scheduling logic to operate on the processor system to halt execution of the program by the first processing core and start execution of the program by the second processing core.

Example B11 is a method of operating a computing device, including: accessing, by a processor system, an initial code file representative of a program; generating, by the processor system, a first assembly code file and a second assembly code file from the initial code file, wherein the first assembly code file is generated for a first instruction set architecture (ISA) and the second assembly code file is generated for a second ISA different from the first ISA; and generating, by the processor system, a first binary representation and a second binary representation from the first assembly code file and the second assembly code file, respectively, wherein the first binary representation and the second binary representation utilize at least one data structure compatible with both the first ISA and the second ISA.

Example B12 may include the subject matter of Example B11, and may further include linking, by the processor system, the first binary representation and the second binary representation into a multi-architecture binary executable.

Example B13 may include the subject matter of Example B12, and may further specify that the multi-architecture binary executable includes a first executable and linkable format (ELF) section corresponding to the first ISA and a second ELF section corresponding to the second ISA.

Example B14 is a method of operating a computing device, including: accessing, by a dynamic loader, a multi-architecture binary executable for a program, wherein the multi-architecture binary executable includes a first binary representation of the program for a first instruction set architecture (ISA) and a second binary representation of the program for a second ISA different from the first ISA; receiving, by the dynamic loader, an indication that the program is to run on the first ISA; and in response to receiving the indication, identifying, by the dynamic loader, the first binary representation.

Example B15 may include the subject matter of Example B14, and may further include using the first binary representation to run the program with a first processing core with the first ISA.

Example B16 may include the subject matter of Example B15, and may further specify that a second processing core has the second ISA, and running the program with the first processing core includes using data stored by the second processing core during running of the program with the second processing core.

Example B17 may include the subject matter of any of Examples B14-16, and may further specify that the program includes an application, a virtual machine (VM), or a container.

Example B18 may include the subject matter of any of Examples B14-17, and may further include: executing the program with a first processing core, wherein the first processing core has the first ISA; halting execution of the program with the first processing core; and resuming operation of the program with a second processing core, wherein the second processing core has the second ISA.

Example B19 is one or more computer readable media (e.g., non-transitory computer readable media) having instructions thereon that, in response to execution by one or more processing devices of a computing device, cause the computing device to: access, from a memory device, a first binary representation for a first instruction set architecture (ISA) and a second binary representation for a second ISA different from the first ISA, wherein the first binary representation and the second binary representation utilize at least one data structure compatible with both the first ISA and the second ISA; select one of the first or second binary representation as corresponding to the ISA of a particular processing core in the computing device; and cause the particular processing core to execute the selected binary representation.

Example B20 may include the subject matter of Example B19, and may further specify that the first binary representation and the second binary representation are included in a multi-architecture binary executable.

Example B21 may include the subject matter of any of Examples B19-20, and may further specify that the first ISA has a first set of operation codes, the second ISA has a second set of operation codes, the first set is not a proper subset of the second set, and the second set is not a proper subset of the first set.

Example B22 may include the subject matter of any of Examples B19-21, and may further specify that the instructions are further to cause the computing device to: after causing the particular processing core to execute the selected binary representation, cause the particular processing core to halt execution of the selected binary representation; select another of the first or second binary representation as corresponding to the ISA of a different particular processing core in the computing device; and cause the different particular processing core to execute the selected other binary representation.

Example B23 is a server system, including: a first processing core having a first instruction set architecture (ISA), and a second processing core having a second ISA different from the first ISA; a baseboard management controller (BMC) coupled to the at least one first processing core and the at least one second processing core; a memory device coupled to the BMC, wherein a first binary representation compatible with the first ISA and a second binary representation compatible with the second ISA are stored in the memory device, the first binary representation and the second binary representation represent a same program, the first binary representation and the second binary representation are linked in a multi-architecture binary executable, and the first binary representation and the second binary representation utilize at least one data structure compatible with both the first ISA and the second ISA.

Example B24 may include the subject matter of Example B23, and may further specify that the first processing core and the second processing core are both coupled to a motherboard, and the server system includes a network interface to communicate with a client device via a computing network.

Example B25 may include the subject matter of any of Examples B23-24, and may further specify that the program includes a virtual machine (VM), a container, or an application.

Example B26 is one or more computer readable media (e.g., non-transitory computer readable media) having instructions thereon that, in response to execution by one or more processing devices of a computing device, cause the computing device to perform the method of any of Examples B11-18.

Example B27 is a computing device including means for performing the method of any of Examples B11-18.

Example B28 is a computing device, method, computer readable media, or server system as described in any of Examples B1-27 in combination with any of the computing devices, methods, computer readable media, or server systems, respectively, as described in any of Examples A1-27.

Example C1 is a computing device, including: a first processing core having a first instruction set architecture (ISA), and a second processing core having a second ISA different from the first ISA; and control logic to halt operation of a program on the first processing core and resume operation of the program on the second processing core.

Example C2 may include the subject matter of Example C1, and may further include a memory device having stored thereon a first binary representation for the program in accordance with the first ISA and a second binary representation for the program in accordance with the second ISA, wherein the memory device has stored thereon data generated by the program, and wherein the data has an in-memory representation compatible with both the first ISA and the second ISA.

Example C3 may include the subject matter of any of Examples C1-2, and may further specify that the first ISA has a first set of operation codes, the second ISA has a second set of operation codes, the first set is not a proper subset of the second set, and the second set is not a proper subset of the first set.

Example C4 may include the subject matter of any of Examples C1-3, and may further specify that the first ISA is a complex instruction set computing (CISC) architecture, and the second ISA is a reduced instruction set computing (RISC) architecture.

Example C5 may include the subject matter of any of Examples C1-4, and may further specify that the first ISA and the second ISA have different word sizes or different endianness.

Example C6 may include the subject matter of any of Examples C1-5, and may further specify that the control logic is to: return operation of the program on the first processing core to a stored checkpoint; and resume operation of the program on the second processing core at the checkpoint.

Example C7 may include the subject matter of Example C6, and may further specify that the control logic is to translate the stored checkpoint to a format compatible with the second ISA before resuming operation of the program on the second processing core.

Example C8 may include the subject matter of any of Examples C1-7, and may further specify that the first processing core has a first program stack associated with the program executing on the first processing core, and the control logic is to: unwind the first program stack to a previous function call; and translate the unwound first program stack into a format readable by the second processing core.

Example C9 may include the subject matter of Example C8, and may further specify that the control logic is to unwind the first program stack to the previous function call using debug data stored during execution of the program on the first processing core.

Example C10 may include the subject matter of any of Examples C8-9, and may further specify that translate the unwound first program stack into the format readable by the second processing core includes play back calls in the unwound first program stack.

Example C11 may include the subject matter of any of Examples C1-10, and may further include scheduling logic to determine that a resource demand exceeds a threshold, wherein operation of the program on the first processing core is halted based on the determination.

Example C12 may include the subject matter of Example C11, and may further specify that the resource demand is a client demand on a server resource.

Example C13 is a method of operating a computing device, including: checkpointing a program executing on a first processing core, wherein the first processing core has a first instruction set architecture (ISA); storing checkpoint data in a format readable by a second processing core, wherein the second processing core has a different ISA from the first ISA; and resuming the program with the second processing core, using the stored checkpoint data.

Example C14 may include the subject matter of Example C13, and may further specify that the program is checkpointed in response to a checkpoint instruction in the program.

Example C15 may include the subject matter of any of Examples C13-14, and may further specify that the program is to store data having an in-memory representation compatible with both the first ISA and the second ISA.

Example C16 may include the subject matter of any of Examples C13-15, and may further specify that execution of the program on the first processing core includes execution of a first binary representation, execution of the program on the second processing core includes execution of a second binary representation different from the first binary representation, and the first and second binary representations are binary compatible.

Example C17 is a method of operating a computing device, including: receiving an instruction to switch execution of a program from a first processing core to a second processing core, wherein the first processing core has a first instruction set architecture (ISA) different from a second ISA of the second processing core; unwinding a program stack associated with execution of the program on the first processing core; translating the unwound program stack into a format readable by the second processing core; and commencing execution of the program on the second processing core using the translated unwound program stack.

Example C18 may include the subject matter of Example C17, and may further specify that unwinding the program stack includes unwinding the program stack to the last function call.

Example C19 may include the subject matter of Example C18, and may further include translating registers associated with execution of the program on the first processing core into a format readable by the second processing core.

Example C20 may include the subject matter of any of Examples C17-19, and may further specify that unwinding the program stack includes using debug data stored during execution of the program on the first processing core.

Example C21 may include the subject matter of any of Examples C17-20, and may further specify that the program includes an application, virtual machine (VM), or container.

Example C22 is a server system, including: a first processing core having a first instruction set architecture (ISA), and a second processing core having a second ISA different from the first ISA; a baseboard management controller (BMC) coupled to the first processing core and the second processing core; a memory device, coupled to the BMC, to store a program stack associated with execution of a program with the first processing core; wherein an operating system of the server is to cause the first processing core to halt execution of the program, translate the program stack to a format readable by the second processing core, and commence execution of the program on the second processing core using the translated program stack.

Example C23 may include the subject matter of Example C22, and may further specify that translation of the first program stack includes rolling back the program stack to a previous function call, and translating the rolled back program stack.

Example C24 may include the subject matter of any of Examples C22-23, and may further specify that the first processing core and the second processing core are both coupled to a motherboard.

Example C25 may include the subject matter of Example C24, and may further specify that a plurality of processing cores having the first ISA, and a plurality of processing cores having the second ISA, are coupled to the motherboard.

Example C26 is one or more computer readable media (e.g., non-transitory computer readable media) having instructions thereon that, in response to execution by one or more processing devices of a computing device, cause the computing device to perform the method of any of Examples C13-21.

Example C27 is a computing device including means for performing the method of any of Examples C13-21.

Example C28 is a computing device, method, computer readable media, or server system as described in any of Examples C1-27 in combination with any of the computing devices, methods, computer readable media, or server systems, respectively, as described in any of Examples A1-27 and/or Examples B1-28.

Example D1 is a computing device, including: a first processing core having a first instruction set architecture (ISA); a second processing core having a second ISA different from the first ISA; a data translation processing device, different from the first processing core and the second processing core; and a bus coupled to the first processing core, the second processing core, and the data translation processing device; wherein the data translation processing device is to translate data structures compatible with the first ISA into data structures compatible with the second ISA.

Example D2 may include the subject matter of Example D1, and may further specify that the data translation processing device is a field programmable gate array (FPGA) or an application specific integrated circuit (ASIC).

Example D3 may include the subject matter of any of Examples D1-2, and may further specify that the data translation processing device, the first processing core, and the second processing core are coupled to a same motherboard.

Example D4 may include the subject matter of any of Examples D1-3, and may further include: a first kernel operating on the first processing core; and a second kernel, different from the first kernel, operating on the second processing core.

Example D5 may include the subject matter of Example D4, and may further include interprocess communication (IPC) logic to send messages between the first kernel and the second kernel.

Example D6 may include the subject matter of any of Examples D1-5, and may further specify that the first ISA is a complex instruction set computing (CISC) architecture, and the second ISA is a reduced instruction set computing (RISC) architecture.

Example D7 may include the subject matter of any of Examples D1-6, and may further specify that the first ISA and the second ISA have different word sizes.

Example D8 may include the subject matter of any of Examples D1-7, and may further specify that the first ISA and the second ISA have different endianness.

Example D9 may include the subject matter of any of Examples D1-8, and may further include scheduling logic to halt execution of a first binary representation operating on the first processing core and start execution of a second binary representation by the second processing core, wherein the first and second binary representation represent a same program.

Example D10 may include the subject matter of any of Examples D1-9, and may further specify that the first processing core and the second processing core share a coherent memory space.

Example D11 is one or more computer readable media (e.g., non-transitory computer readable media) having instructions thereon that, in response to execution by one or more processing devices of a computing device, cause the computing device to: receive an instruction to switch a program from execution on a first processing core to execution on a second processing core, wherein the first processing core has a first instruction set architecture (ISA) and the second processing core has an ISA different from the first ISA; and provide program data to a data translation processing device, different from the first processing core and the second processing core.

Example D12 may include the subject matter of Example D11, and may further specify that the program data includes a checkpoint of the program.

Example D13 may include the subject matter of any of Examples D11-12, and may further specify that the program data includes a program stack.

Example D14 may include the subject matter of any of Examples D11-13, and may further specify that the data translation processing device is coupled to a same circuit board as the first processing core and the second processing core.

Example D15 may include the subject matter of any of Examples D11-14, and may further specify that a first operating system runs on the first processing core and a second operating system, different from the first operating system, runs on the second processing core.

Example D16 may include the subject matter of Example D15, and may further specify that the first processing core and the second processing core share a memory space, and data translated by the data translation processing device is stored in the memory space.

Example D17 is a method of operating a computing device, including: accessing program data from a memory, by a data translation processing device, wherein the program data represents the operation of the program on a first processing core having a first instruction set architecture (ISA); translating data structures in the program data, by the data translation processing device, from the format of the first ISA to a format of a second ISA different from the first ISA; and storing, by the data translation processing device, the translated data structures in the memory; wherein the data translation processing device is different from the first processing core and the second processing core.

Example D18 may include the subject matter of Example D17, and may further specify that the data translation processing device is a field programmable gate array (FPGA) or an application specific integrated circuit (ASIC).

Example D19 may include the subject matter of any of Examples D17-18, and may further specify that translating data structures includes translating a word size or endianness.

Example D20 may include the subject matter of any of Examples D17-19, and may further specify that the memory is a coherent memory space for the first processing core and the second processing core.

Example D21 is a server system, including: a plurality of servers, wherein individual servers include a first processing core having a first instruction set architecture (ISA), a second processing core having a second ISA different from the first ISA, and a data translation processing device, different from the first processing core and the second processing core, wherein the data translation processing device is coupled to a same circuit board as the first processing core and the second processing core, a memory device, and a bus coupling the first processing core, the second processing core, and the data translation processing device to the memory device, wherein the data translation processing device is to translate data structures compatible with the first ISA into data structures compatible with the second ISA; and a communication network coupling the plurality of servers.

Example D22 may include the subject matter of Example D21, and may further specify that individual servers further include a network interface to communicate with a client device via a computing network.

Example D23 may include the subject matter of any of Examples D21-22, and may further specify that individual servers further include a baseboard management controller.

Example D24 may include the subject matter of any of Examples D21-23, and may further specify that the data translation processing device is to translate data structures upon transfer of operation of a program from the first processing core to the second processing core, and upon transfer of operation of the program from the second processing core to the first processing core.

Example D25 may include the subject matter of Example D24, and may further specify that the program includes a virtual machine (VM), a container, or an application.

Example D26 is one or more computer readable media (e.g., non-transitory computer readable media) having instructions thereon that, in response to execution by one or more processing devices of a computing device, cause the computing device to perform the method of any of Examples D17-20.

Example D27 is a computing device including means for performing the method of any of Examples D17-20.

Example D28 is a computing device, method, computer readable media, or server system as described in any of Examples D1-27 in combination with any of the computing devices, methods, computer readable media, or server systems, respectively, as described in any of Examples A1-27 and/or Examples B1-28 and/or Examples C1-28.

The invention claimed is:

1. A computing device, comprising:
a first processing core having a first instruction set architecture (ISA), and a second processing core having a second ISA different from the first ISA; and
control logic to halt operation of a program on the first processing core and resume operation of the program on the second processing core;
wherein the first processing core has a first program stack associated with the program executing on the first processing core, and the control logic is to:
unwind the first program stack to a previous function call using debug data stored during execution of the program on the first processing core, and
translate the unwound first program stack into a format readable by the second processing core.

2. The computing device of claim 1, further comprising:
a memory device having stored thereon a first binary representation for the program in accordance with the first ISA and a second binary representation for the program in accordance with the second ISA, wherein the memory device has stored thereon data generated by the program, and wherein the data has an in-memory representation compatible with both the first ISA and the second ISA.

3. The computing device of claim 1, wherein the first ISA has a first set of operation codes, the second ISA has a second set of operation codes, the first set is not a proper subset of the second set, and the second set is not a proper subset of the first set.

4. The computing device of claim 3, wherein the first ISA is a complex instruction set computing (CISC) architecture, and the second ISA is a reduced instruction set computing (RISC) architecture.

5. The computing device of claim 1, wherein the first ISA and the second ISA have different word sizes or different endianness.

6. The computing device of claim 1, wherein the control logic is to:

return operation of the program on the first processing core to a stored checkpoint; and
resume operation of the program on the second processing core at the checkpoint.

7. The computing device of claim 6, wherein the control logic is to translate the stored checkpoint to a format compatible with the second ISA before resuming operation of the program on the second processing core.

8. The computing device of claim 1, wherein translating the unwound first program stack into the format readable by the second processing core includes playing back calls in the unwound first program stack.

9. The computing device of claim 1, further comprising:
scheduling logic to determine that a resource demand exceeds a threshold;
wherein operation of the program on the first processing core is halted based on the determination.

10. The computing device of claim 9, wherein the resource demand is a client demand on a server resource.

11. The computing device of claim 1, wherein the program is to store data having an in-memory representation compatible with both the first ISA and the second ISA.

12. The computing device of claim 1, wherein the control logic is further to:
translate registers associated with execution of the program on the first processing core into a format readable by the second processing core.

13. A method of operating a computing device, comprising:
receiving an instruction to switch execution of a program from a first processing core to a second processing core, wherein the first processing core has a first instruction set architecture (ISA) different from a second ISA of the second processing core;
unwinding a program stack associated with execution of the program on the first processing core using debug data stored during execution of the program on the first processing core;
translating the unwound program stack into a format readable by the second processing core; and
commencing execution of the program on the second processing core using the translated unwound program stack.

14. The method of claim 13, wherein unwinding the program stack includes unwinding the program stack to the last function call.

15. The method of claim 14, further comprising:
translating registers associated with execution of the program on the first processing core into a format readable by the second processing core.

16. The method of claim 13, wherein the program includes an application, virtual machine (VM), or container.

17. A server system, comprising:
a first processing core having a first instruction set architecture (ISA), and a second processing core having a second ISA different from the first ISA;
a baseboard management controller (BMC) coupled to the first processing core and the second processing core;
a memory device, coupled to the BMC, to store a program stack associated with execution of a program with the first processing core;
wherein an operating system of the server is to cause the first processing core to halt execution of the program, translate the program stack to a format readable by the second processing core, and commence execution of the program on the second processing core using the translated program stack;
wherein translation of the program stack includes rolling back the program stack to a previous function call, and translating the rolled back program stack; and
wherein rolling back the program stack uses debug data stored during execution of the program with the first processing core.

18. The server system of claim 17, wherein translation of the program stack includes rolling back the program stack to a previous function call, and translating the rolled back program stack.

19. The server system of claim 17, wherein the first processing core and the second processing core are both coupled to a motherboard.

20. The server system of claim 19, wherein a plurality of processing cores having the first ISA, and a plurality of processing cores having the second ISA, are coupled to the motherboard.

21. The computing device of claim 1, wherein operation of the program on the first processing core includes execution of a first binary representation, operation of the program on the second processing core includes execution of a second binary representation different from the first binary representation, and the first and second binary representations are binary compatible.

* * * * *

UNITED STATES PATENT AND TRADEMARK OFFICE
CERTIFICATE OF CORRECTION

PATENT NO. : 10,552,207 B2
APPLICATION NO. : 15/386990
DATED : February 4, 2020
INVENTOR(S) : Eliezer Tamir et al.

Page 1 of 1

It is certified that error appears in the above-identified patent and that said Letters Patent is hereby corrected as shown below:

In the Claims

In Column 34, Line 59, in Claim 4, delete "claim 3" and insert -- claim 1 -- therefor.

Signed and Sealed this
Twenty-fourth Day of March, 2020

Andrei Iancu
*Director of the United States Patent and Trademark Office*